US008767925B2

(12) United States Patent
Sureka et al.

(10) Patent No.: US 8,767,925 B2
(45) Date of Patent: Jul. 1, 2014

(54) INTERACTIVE ASSISTANT FOR MANAGING TELEPHONE COMMUNICATIONS

(71) Applicant: Verizon Data Services LLC, Temple Terrace, FL (US)

(72) Inventors: Ashutosh K Sureka, Irving, TX (US); Craig L Reding, Midland Park, NJ (US); Shuchi R Patel, Irving, TX (US); Alin L D'Silva, Newton, MA (US); Paula A Dromlewicz, Holden, MA (US); Sathish Subramanian, Erode (IN)

(73) Assignee: Verizon Data Services LLC, Temple Terrace, FL (US)

( * ) Notice: Subject to any disclaimer, the term of this patent is extended or adjusted under 35 U.S.C. 154(b) by 0 days.

(21) Appl. No.: 13/919,881

(22) Filed: Jun. 17, 2013

(65) Prior Publication Data
US 2013/0279680 A1   Oct. 24, 2013

Related U.S. Application Data

(60) Division of application No. 11/156,134, filed on Jun. 17, 2005, now Pat. No. 8,467,502, which is a continuation-in-part of application No. 10/858,973, filed on Jun. 2, 2004, now abandoned, and a (Continued)

(51) Int. Cl.
| | |
|---|---|
| *H04M 1/64* | (2006.01) |
| *H04N 7/14* | (2006.01) |
| *H04L 29/08* | (2006.01) |
| *G06F 15/16* | (2006.01) |
| *H04M 3/42* | (2006.01) |

(52) U.S. Cl.
USPC ............. 379/88.12; 345/473; 348/14.08; 370/263; 370/318; 370/352; 370/467; 370/522; 379/93.14; 379/202.01; 379/204.01; 379/205.01; 379/220.01; 455/557; 709/204; 709/206; 709/227; 709/238; 714/25; 725/106

(58) Field of Classification Search
CPC ....................................................... H04M 3/56
USPC ........... 348/14.08, 14.09; 370/467, 263, 318, 370/352, 522, 261; 379/88.12, 93.14, 379/202.01, 220.01, 204.01, 205.01; 455/557; 709/204, 227, 206, 328; 719/328; 345/473; 714/25; 725/106
See application file for complete search history.

(56) References Cited

U.S. PATENT DOCUMENTS

| | | |
|---|---|---|
| 4,013,839 A | 3/1977 | Bell |
| 4,540,850 A | 9/1985 | Herr et al. |

(Continued)

FOREIGN PATENT DOCUMENTS

| | | |
|---|---|---|
| CA | 2240878 | 12/1998 |
| DE | 10110942 | 9/2002 |

(Continued)

OTHER PUBLICATIONS

"Audio Digitizing Process," TalkBank, http://www.talkbank.org/da/audiodig.html, six pages, retrieved from the internet on Oct. 15, 2003.

(Continued)

*Primary Examiner* — Gerald Gauthier

(57) ABSTRACT

An interactive assistant for managing telephone communications and services is disclosed. In one of many possible method embodiments, a chat interface is provided to a device associated with an intended recipient of an incoming voice call. A chat message from the intended recipient is received through the chat interface. The chat message is presented to a calling party associated with the incoming call prior to a disposition of the call being determined. In other embodiments, an interface provides controls for individually managing calls on a conference call, without affecting other calls on the conference call.

19 Claims, 17 Drawing Sheets

Related U.S. Application Data continuation-in-part of application No. 10/720,784, filed on Nov. 24, 2003, now Pat. No. 8,494,135, and a continuation-in-part of application No. 10/720,661, filed on Nov. 24, 2003, now Pat. No. 8,503,650, and a continuation-in-part of application No. 10/721,009, filed on Nov. 24, 2003, and a continuation-in-part of application No. 10/721,005, filed on Nov. 24, 2003, now Pat. No. 7,912,193, said application No. 11/156,134 is a continuation-in-part of application No. 10/720,825, filed on Nov. 24, 2003, and a continuation-in-part of application No. 10/720,952, filed on Nov. 24, 2003, now Pat. No. 8,503,639, and a continuation-in-part of application No. 10/720,944, filed on Nov. 24, 2003, now Pat. No. 8,488,766, and a continuation-in-part of application No. 10/720,943, filed on Nov. 24, 2003, now Pat. No. 7,912,199, and a continuation-in-part of application No. 10/720,938, filed on Nov. 24, 2003, now Pat. No. 8,750,482, and a continuation-in-part of application No. 10/720,933, filed on Nov. 24, 2003, now Pat. No. 8,751,571, and a continuation-in-part of application No. 10/720,920, filed on Nov. 24, 2003, and a continuation-in-part of application No. 10/720,970, filed on Nov. 24, 2003, now Pat. No. 8,472,931, and a continuation-in-part of application No. 10/720,971, filed on Nov. 24, 2003, now Pat. No. 8,472,428, and a continuation of application No. 10/720,859, filed on Nov. 24, 2003, now Pat. No. 7,418,090, and a continuation-in-part of application No. 10/720,868, filed on Nov. 24, 2003, now Pat. No. 8,472,606, and a continuation-in-part of application No. 10/720,633, filed on Nov. 24, 2003, and a continuation-in-part of application No. 10/720,870, filed on Nov. 24, 2003, now Pat. No. 8,488,761, and a continuation-in-part of application No. 10/083,793, filed on Feb. 27, 2002, application No. 11/156,134, which is a continuation-in-part of application No. 10/084,121, filed on Feb. 27, 2002, now abandoned, and a continuation-in-part of application No. 10/083,792, filed on Feb. 27, 2002, now Pat. No. 7,142,646, and a continuation-in-part of application No. 10/083,822, filed on Feb. 27, 2002, now Pat. No. 7,903,796, and a continuation-in-part of application No. 10/083,884, filed on Feb. 27, 2002, now Pat. No. 7,190,773.

(60) Provisional application No. 60/428,704, filed on Nov. 25, 2002, provisional application No. 60/436,018, filed on Dec. 26, 2002, provisional application No. 60/475,047, filed on Jun. 2, 2003, provisional application No. 60/275,020, filed on Mar. 13, 2001, provisional application No. 60/275,719, filed on Mar. 13, 2001, provisional application No. 60/275,667, filed on Mar. 13, 2001, provisional application No. 60/276,505, filed on Mar. 19, 2001, provisional application No. 60/275,031, filed on Mar. 13, 2001, provisional application No. 60/272,167, filed on Feb. 27, 2001, provisional application No. 60/272,122, filed on Feb. 27, 2001.

(56) References Cited

U.S. PATENT DOCUMENTS

| | | | | |
|---|---|---|---|---|
| 4,600,814 | A | 7/1986 | Cunniff et al. | |
| 4,734,931 | A | 3/1988 | Bourg et al. | |
| 4,924,496 | A | 5/1990 | Figa et al. | |
| 5,014,303 | A | 5/1991 | Velius | |
| 5,113,431 | A * | 5/1992 | Horn | 379/93.14 |
| 5,168,515 | A | 12/1992 | Gechter et al. | |
| 5,222,125 | A | 6/1993 | Creswell et al. | |
| 5,274,700 | A | 12/1993 | Gechter et al. | |
| 5,327,486 | A | 7/1994 | Wolff et al. | |
| 5,329,578 | A | 7/1994 | Brennan et al. | |
| 5,428,663 | A | 6/1995 | Grimes et al. | |
| 5,440,624 | A | 8/1995 | Schoof | |
| 5,483,586 | A | 1/1996 | Sussman | |
| 5,533,096 | A | 7/1996 | Bales | |
| 5,535,265 | A | 7/1996 | Suwandhaputra | |
| 5,546,449 | A * | 8/1996 | Hogan et al. | 379/202.01 |
| 5,548,636 | A | 8/1996 | Bannister et al. | |
| 5,550,907 | A | 8/1996 | Carlsen | |
| 5,583,564 | A | 12/1996 | Rao et al. | |
| 5,586,173 | A | 12/1996 | Misholi et al. | |
| 5,588,037 | A | 12/1996 | Fuller et al. | |
| 5,608,788 | A | 3/1997 | Demlow et al. | |
| 5,619,555 | A | 4/1997 | Fenton et al. | |
| 5,621,787 | A | 4/1997 | McKoy et al. | |
| 5,623,541 | A | 4/1997 | Boyle et al. | |
| 5,631,904 | A | 5/1997 | Fitser et al. | |
| 5,638,434 | A | 6/1997 | Gottlieb et al. | |
| 5,649,105 | A | 7/1997 | Aldred et al. | |
| 5,652,789 | A | 7/1997 | Miner et al. | |
| 5,661,788 | A | 8/1997 | Chin | |
| 5,668,863 | A | 9/1997 | Bieselin et al. | |
| 5,673,080 | A | 9/1997 | Biggs et al. | |
| 5,692,213 | A | 11/1997 | Goldberg et al. | |
| 5,710,591 | A | 1/1998 | Bruno et al. | |
| 5,712,903 | A | 1/1998 | Bartholomew et al. | |
| 5,715,444 | A | 2/1998 | Danish et al. | |
| 5,717,863 | A | 2/1998 | Adamson et al. | |
| 5,719,925 | A | 2/1998 | Peoples | |
| 5,724,412 | A | 3/1998 | Srinivasan | |
| 5,742,095 | A | 4/1998 | Bryant et al. | |
| 5,742,668 | A | 4/1998 | Pepe et al. | |
| 5,742,905 | A | 4/1998 | Pepe et al. | |
| 5,745,561 | A | 4/1998 | Baker et al. | |
| 5,745,884 | A | 4/1998 | Carnegie et al. | |
| 5,751,800 | A | 5/1998 | Ardon | |
| 5,752,191 | A | 5/1998 | Fuller et al. | |
| 5,764,901 | A | 6/1998 | Skarbo et al. | |
| 5,805,607 | A | 9/1998 | Khu | |
| 5,805,670 | A | 9/1998 | Pons et al. | |
| 5,841,837 | A | 11/1998 | Fuller et al. | |
| 5,864,603 | A | 1/1999 | Haavisto et al. | |
| 5,872,841 | A | 2/1999 | King et al. | |
| 5,875,242 | A | 2/1999 | Glaser et al. | |
| 5,875,437 | A | 2/1999 | Atkins | |
| 5,892,900 | A | 4/1999 | Ginter et al. | |
| 5,903,845 | A | 5/1999 | Buhrmann et al. | |
| 5,907,324 | A | 5/1999 | Larson et al. | |
| 5,907,547 | A | 5/1999 | Foladare et al. | |
| 5,907,604 | A | 5/1999 | Hsu | |
| 5,910,987 | A | 6/1999 | Ginter et al. | |
| 5,916,302 | A | 6/1999 | Dunn et al. | |
| 5,917,817 | A | 6/1999 | Dunn et al. | |
| 5,917,912 | A | 6/1999 | Ginter et al. | |
| 5,920,826 | A | 7/1999 | Metso et al. | |
| 5,920,847 | A | 7/1999 | Kolling et al. | |
| 5,926,535 | A | 7/1999 | Reynolds | |
| 5,944,769 | A | 8/1999 | Musk et al. | |
| 5,945,989 | A | 8/1999 | Freishtat et al. | |
| 5,960,342 | A | 9/1999 | Liem et al. | |
| 5,963,925 | A | 10/1999 | Kolling et al. | |
| 5,982,870 | A | 11/1999 | Pershan et al. | |
| 6,005,870 | A | 12/1999 | Leung et al. | |
| 6,011,579 | A * | 1/2000 | Newlin | 348/14.08 |
| 6,018,571 | A | 1/2000 | Langlois et al. | |
| 6,018,737 | A | 1/2000 | Shah et al. | |
| 6,021,428 | A | 2/2000 | Miloslavsky | |
| 6,029,151 | A | 2/2000 | Nikander | |
| 6,031,896 | A | 2/2000 | Gardell et al. | |
| 6,041,103 | A | 3/2000 | La Porta et al. | |
| 6,052,372 | A | 4/2000 | Gittins et al. | |
| 6,058,163 | A | 5/2000 | Pattison et al. | |
| 6,061,432 | A | 5/2000 | Wallace et al. | |
| 6,078,658 | A * | 6/2000 | Yunoki | 379/220.01 |

(56) References Cited

U.S. PATENT DOCUMENTS

| | | | |
|---|---|---|---|
| 6,088,435 A * | 7/2000 | Barber et al. ............ 379/205.01 |
| 6,092,102 A | 7/2000 | Wagner |
| 6,100,882 A | 8/2000 | Sharman et al. |
| 6,122,348 A | 9/2000 | French-St. George et al. |
| 6,134,318 A | 10/2000 | O'Neil |
| 6,134,548 A | 10/2000 | Gottsman et al. |
| 6,144,671 A | 11/2000 | Perinpanathan et al. |
| 6,145,096 A * | 11/2000 | Bereiter et al. ................ 714/25 |
| 6,154,646 A | 11/2000 | Tran et al. |
| 6,161,008 A | 12/2000 | Lee et al. |
| 6,163,692 A | 12/2000 | Chakrabarti et al. |
| 6,167,119 A | 12/2000 | Bartholomew et al. |
| 6,188,756 B1 | 2/2001 | Mashinsky |
| 6,189,026 B1 | 2/2001 | Birrell et al. |
| 6,192,123 B1 | 2/2001 | Grunsted et al. |
| 6,195,660 B1 | 2/2001 | Polnerow et al. |
| 6,215,863 B1 | 4/2001 | Bennett et al. |
| 6,219,413 B1 | 4/2001 | Burg |
| 6,226,374 B1 | 5/2001 | Howell et al. |
| 6,240,449 B1 | 5/2001 | Nadeau |
| 6,243,366 B1 * | 6/2001 | Bradley et al. ................ 370/318 |
| 6,260,050 B1 | 7/2001 | Yost et al. |
| 6,275,575 B1 | 8/2001 | Wu |
| 6,282,522 B1 | 8/2001 | Davis et al. |
| 6,298,062 B1 | 10/2001 | Gardell et al. |
| 6,298,129 B1 | 10/2001 | Culver et al. |
| 6,301,338 B1 | 10/2001 | Makela et al. |
| 6,301,609 B1 | 10/2001 | Aravamudan et al. |
| 6,310,939 B1 | 10/2001 | Varney |
| 6,310,947 B1 | 10/2001 | Polcyn |
| 6,324,269 B1 | 11/2001 | Malik |
| 6,330,321 B2 * | 12/2001 | Detampel et al. ........ 379/205.01 |
| 6,333,973 B1 | 12/2001 | Smith et al. |
| 6,349,299 B1 | 2/2002 | Spencer et al. |
| 6,351,279 B1 | 2/2002 | Sawyer |
| 6,363,143 B1 | 3/2002 | Fox |
| 6,371,484 B1 | 4/2002 | Yuan |
| 6,373,817 B1 | 4/2002 | Kung et al. |
| 6,373,930 B1 | 4/2002 | McConnell et al. |
| 6,385,754 B1 | 5/2002 | Mizumoto et al. |
| 6,389,113 B1 | 5/2002 | Silverman |
| 6,404,873 B1 | 6/2002 | Beyda et al. |
| 6,408,191 B1 | 6/2002 | Blanchard et al. |
| 6,408,327 B1 | 6/2002 | McClennon et al. |
| 6,411,605 B1 | 6/2002 | Vance et al. |
| 6,418,214 B1 | 7/2002 | Smythe et al. |
| 6,430,176 B1 | 8/2002 | Christie |
| 6,430,289 B1 | 8/2002 | Liffick |
| 6,434,226 B1 | 8/2002 | Takahashi |
| 6,442,245 B1 | 8/2002 | Castagna et al. |
| 6,442,251 B1 | 8/2002 | Maes et al. |
| 6,442,748 B1 | 8/2002 | Bowman-Amuah |
| 6,453,031 B2 | 9/2002 | Malik |
| 6,453,167 B1 | 9/2002 | Michaels et al. |
| 6,459,780 B1 | 10/2002 | Wurster et al. |
| 6,459,913 B2 | 10/2002 | Cloutier |
| 6,463,145 B1 | 10/2002 | O'Neal et al. |
| 6,463,464 B1 | 10/2002 | Lazaridis et al. |
| 6,466,910 B1 | 10/2002 | Desmond et al. |
| 6,470,079 B1 | 10/2002 | Benson |
| 6,473,615 B1 | 10/2002 | Theppasandra et al. |
| 6,477,374 B1 | 11/2002 | Shaffer et al. |
| 6,480,830 B1 | 11/2002 | Ford et al. |
| 6,480,890 B1 | 11/2002 | Lee et al. |
| 6,507,644 B1 | 1/2003 | Henderson et al. |
| 6,519,326 B1 | 2/2003 | Milewski et al. |
| 6,522,734 B1 | 2/2003 | Allen et al. |
| 6,526,134 B1 | 2/2003 | Wallenius |
| 6,532,285 B1 | 3/2003 | Tucker et al. |
| 6,535,596 B1 | 3/2003 | Frey et al. |
| 6,539,082 B1 | 3/2003 | Lowe et al. |
| 6,542,596 B1 | 4/2003 | Hill et al. |
| 6,546,005 B1 | 4/2003 | Berkley et al. |
| 6,546,262 B1 * | 4/2003 | Freadman .................... 455/557 |
| 6,547,830 B1 | 4/2003 | Mercer |
| 6,560,329 B1 | 5/2003 | Draginich et al. |
| 6,563,914 B2 | 5/2003 | Sammon et al. |
| 6,564,261 B1 | 5/2003 | Gudjonsson et al. |
| 6,574,324 B1 | 6/2003 | Malik |
| 6,574,470 B1 | 6/2003 | Chow et al. |
| 6,577,622 B1 | 6/2003 | Schuster et al. |
| 6,577,720 B1 | 6/2003 | Sutter |
| 6,584,122 B1 | 6/2003 | Matthews et al. |
| 6,587,890 B1 * | 7/2003 | Kult et al. ..................... 719/328 |
| 6,590,603 B2 | 7/2003 | Sheldon et al. |
| 6,590,969 B1 | 7/2003 | Peters et al. |
| 6,594,352 B1 | 7/2003 | Smith |
| 6,594,470 B1 | 7/2003 | Barnes et al. |
| 6,600,736 B1 | 7/2003 | Ball et al. |
| 6,609,113 B1 | 8/2003 | O'Leary et al. |
| 6,611,590 B1 | 8/2003 | Lu et al. |
| 6,614,786 B1 | 9/2003 | Byers |
| 6,618,710 B1 | 9/2003 | Zondervan et al. |
| 6,625,258 B1 | 9/2003 | Ram et al. |
| 6,628,194 B1 | 9/2003 | Hellebust et al. |
| 6,628,770 B1 | 9/2003 | Jain et al. |
| 6,631,186 B1 | 10/2003 | Adams et al. |
| 6,636,587 B1 | 10/2003 | Nagai et al. |
| 6,643,356 B1 | 11/2003 | Hickey et al. |
| 6,654,768 B2 | 11/2003 | Celik |
| 6,661,340 B1 | 12/2003 | Saylor et al. |
| 6,665,388 B2 | 12/2003 | Bedingfield |
| 6,668,046 B1 | 12/2003 | Albal |
| 6,668,049 B1 | 12/2003 | Koch et al. |
| 6,681,119 B1 | 1/2004 | Verdonk |
| 6,683,939 B1 | 1/2004 | Chiloyan et al. |
| 6,687,362 B1 | 2/2004 | Lindquist et al. |
| 6,690,672 B1 | 2/2004 | Klein |
| 6,693,897 B1 | 2/2004 | Huang |
| 6,694,351 B1 * | 2/2004 | Shaffer et al. ................ 709/204 |
| 6,697,461 B1 | 2/2004 | Middleswarth et al. |
| 6,697,796 B2 | 2/2004 | Kermani |
| 6,704,294 B1 | 3/2004 | Cruickshank |
| 6,711,158 B1 | 3/2004 | Kahane et al. |
| 6,717,938 B1 | 4/2004 | D'Angelo |
| 6,718,026 B1 | 4/2004 | Pershan et al. |
| 6,718,178 B1 | 4/2004 | Sladek et al. |
| 6,724,887 B1 | 4/2004 | Eilbacher et al. |
| 6,731,238 B2 | 5/2004 | Johnson |
| 6,735,292 B1 | 5/2004 | Johnson |
| 6,738,458 B1 | 5/2004 | Cline et al. |
| 6,744,861 B1 | 6/2004 | Pershan et al. |
| 6,747,970 B1 * | 6/2004 | Lamb et al. ................... 370/352 |
| 6,748,054 B1 | 6/2004 | Gross et al. |
| 6,754,227 B1 * | 6/2004 | Petersen et al. ............... 370/467 |
| 6,757,365 B1 | 6/2004 | Bogard |
| 6,768,788 B1 | 7/2004 | Langseth et al. |
| 6,768,790 B1 | 7/2004 | Manduley et al. |
| 6,771,949 B1 | 8/2004 | Corliss |
| 6,772,436 B1 * | 8/2004 | Doganata et al. ............. 725/106 |
| 6,775,267 B1 | 8/2004 | Kung et al. |
| 6,775,546 B1 | 8/2004 | Fuller |
| 6,788,772 B2 | 9/2004 | Barak et al. |
| 6,788,775 B1 | 9/2004 | Simpson |
| 6,792,092 B1 | 9/2004 | Michalewicz |
| 6,798,753 B1 | 9/2004 | Doganata et al. |
| 6,801,610 B1 * | 10/2004 | Malik ....................... 379/202.01 |
| 6,807,258 B1 | 10/2004 | Malik |
| 6,807,259 B1 | 10/2004 | Patel et al. |
| 6,816,468 B1 | 11/2004 | Cruickshank |
| 6,816,469 B1 | 11/2004 | Kung et al. |
| 6,820,055 B2 | 11/2004 | Saindon et al. |
| 6,839,417 B2 * | 1/2005 | Weisman et al. ......... 379/204.01 |
| 6,842,460 B1 | 1/2005 | Olkkonen et al. |
| 6,847,823 B2 | 1/2005 | Lehikoinen et al. |
| 6,853,634 B1 | 2/2005 | Davies et al. |
| 6,853,713 B1 | 2/2005 | Fobert et al. |
| 6,856,974 B1 | 2/2005 | Ganesan et al. |
| 6,870,916 B2 * | 3/2005 | Henrikson et al. ........ 379/202.01 |
| 6,876,632 B1 | 4/2005 | Takeda |
| 6,876,736 B2 | 4/2005 | Lamy et al. |
| 6,882,714 B2 | 4/2005 | Mansfield |
| 6,882,838 B1 | 4/2005 | Lee et al. |
| 6,885,742 B1 | 4/2005 | Smith |

(56) References Cited

U.S. PATENT DOCUMENTS

| | | |
|---|---|---|
| 6,907,111 B1 | 6/2005 | Zhang et al. |
| 6,917,610 B1 | 7/2005 | Kung et al. |
| 6,937,713 B1 | 8/2005 | Kung et al. |
| 6,944,279 B2 | 9/2005 | Elsey et al. |
| 6,947,538 B2 | 9/2005 | Shen et al. |
| 6,954,521 B2 | 10/2005 | Bull et al. |
| 6,954,524 B2 | 10/2005 | Gibson |
| 6,956,942 B2 | 10/2005 | McKinzie et al. |
| 6,958,984 B2 | 10/2005 | Kotzin |
| 6,961,409 B2 | 11/2005 | Kato |
| 6,963,857 B1 | 11/2005 | Johnson |
| 6,970,705 B2 | 11/2005 | Yoshimoto et al. |
| 6,988,132 B2 | 1/2006 | Horvitz |
| 6,996,227 B2 | 2/2006 | Albal et al. |
| 6,996,370 B2 | 2/2006 | De Loye et al. |
| 6,999,563 B1 | 2/2006 | Thorpe et al. |
| 7,024,209 B1 | 4/2006 | Gress et al. |
| 7,027,435 B2 | 4/2006 | Bardehle |
| 7,031,437 B1 | 4/2006 | Parsons et al. |
| 7,043,521 B2 | 5/2006 | Eitel |
| 7,050,558 B1 | 5/2006 | Pershan et al. |
| 7,065,198 B2 | 6/2006 | Brown et al. |
| 7,068,768 B2 | 6/2006 | Barnes |
| 7,069,298 B2 | 6/2006 | Zhu et al. |
| 7,076,528 B2 | 7/2006 | Premutico |
| 7,099,288 B1 | 8/2006 | Parker et al. |
| 7,102,643 B2 * | 9/2006 | Moore et al. ............... 345/473 |
| 7,107,312 B2 | 9/2006 | Hackbarth et al. |
| 7,116,972 B1 | 10/2006 | Zhang et al. |
| 7,127,050 B2 | 10/2006 | Walsh et al. |
| 7,130,390 B2 | 10/2006 | Abburi |
| 7,136,461 B1 | 11/2006 | Swingle et al. |
| 7,139,728 B2 | 11/2006 | Rigole |
| 7,139,782 B2 | 11/2006 | Osaki |
| 7,142,646 B2 | 11/2006 | Zafar et al. |
| 7,149,773 B2 | 12/2006 | Haller et al. |
| 7,155,001 B2 | 12/2006 | Tiliks et al. |
| 7,167,552 B1 * | 1/2007 | Shaffer et al. ............ 379/202.01 |
| 7,174,306 B1 | 2/2007 | Haseltine |
| 7,181,417 B1 | 2/2007 | Langseth et al. |
| 7,187,932 B1 | 3/2007 | Barchi |
| 7,190,773 B1 | 3/2007 | D'Silva et al. |
| 7,209,955 B1 | 4/2007 | Major et al. |
| 7,212,808 B2 | 5/2007 | Engstrom et al. |
| 7,245,929 B2 | 7/2007 | Henderson et al. |
| 7,254,220 B1 | 8/2007 | Reding et al. |
| 7,254,643 B1 | 8/2007 | Peters et al. |
| 7,283,808 B2 | 10/2007 | Castell et al. |
| 7,289,489 B1 | 10/2007 | Kung et al. |
| 7,308,087 B2 | 12/2007 | Joyce et al. |
| 7,315,614 B2 | 1/2008 | Bedingfield et al. |
| 7,353,258 B2 * | 4/2008 | Washburn ................... 709/206 |
| 7,379,538 B1 | 5/2008 | Ali et al. |
| 7,418,090 B2 | 8/2008 | Reding et al. |
| 7,420,935 B2 * | 9/2008 | Virolainen ................... 370/263 |
| 7,428,580 B2 | 9/2008 | Hullfish et al. |
| 7,546,337 B1 | 6/2009 | Crawford |
| 7,561,872 B1 | 7/2009 | Koch et al. |
| 7,606,909 B1 * | 10/2009 | Ely et al. .................... 709/227 |
| 7,616,747 B2 | 11/2009 | Wurster et al. |
| 7,912,193 B2 | 3/2011 | Chingon et al. |
| 8,166,173 B2 * | 4/2012 | Low et al. ................... 709/227 |
| 8,238,380 B2 * | 8/2012 | D'Angelo ................... 370/522 |
| 8,271,591 B2 * | 9/2012 | Malik et al. ................ 709/206 |
| 8,467,502 B2 * | 6/2013 | Sureka et al. .............. 379/88.12 |
| 2001/0003202 A1 | 6/2001 | Mache et al. |
| 2001/0012286 A1 | 8/2001 | Huna et al. |
| 2001/0014863 A1 | 8/2001 | Williams |
| 2001/0017777 A1 | 8/2001 | Maruyama et al. |
| 2001/0025262 A1 | 9/2001 | Ahmed |
| 2001/0025280 A1 | 9/2001 | Mandato et al. |
| 2001/0032181 A1 | 10/2001 | Jakstadt et al. |
| 2001/0039191 A1 | 11/2001 | Maierhofer |
| 2001/0040954 A1 | 11/2001 | Brachman et al. |
| 2001/0043689 A1 | 11/2001 | Malik |
| 2001/0043690 A1 | 11/2001 | Bakshi et al. |
| 2001/0043691 A1 | 11/2001 | Bull et al. |
| 2001/0051534 A1 | 12/2001 | Amin |
| 2001/0051919 A1 | 12/2001 | Mason |
| 2001/0054066 A1 | 12/2001 | Spitzer |
| 2001/0056466 A1 | 12/2001 | Thompson et al. |
| 2002/0012425 A1 | 1/2002 | Brisebois et al. |
| 2002/0018550 A1 | 2/2002 | Hafez |
| 2002/0022453 A1 | 2/2002 | Balog et al. |
| 2002/0026575 A1 | 2/2002 | Wheeler et al. |
| 2002/0035617 A1 | 3/2002 | Lynch et al. |
| 2002/0040355 A1 | 4/2002 | Weiner |
| 2002/0046299 A1 | 4/2002 | Lefeber et al. |
| 2002/0055351 A1 | 5/2002 | Elsey et al. |
| 2002/0057678 A1 | 5/2002 | Jiang et al. |
| 2002/0062251 A1 | 5/2002 | Anandan et al. |
| 2002/0064268 A1 | 5/2002 | Pelletier |
| 2002/0069060 A1 | 6/2002 | Cannavo et al. |
| 2002/0069096 A1 | 6/2002 | Lindoerfer et al. |
| 2002/0071539 A1 | 6/2002 | Diament et al. |
| 2002/0073163 A1 | 6/2002 | Churchill et al. |
| 2002/0075303 A1 | 6/2002 | Thompson et al. |
| 2002/0075306 A1 | 6/2002 | Thompson et al. |
| 2002/0076022 A1 | 6/2002 | Bedingfield |
| 2002/0076025 A1 | 6/2002 | Liversidge et al. |
| 2002/0076026 A1 | 6/2002 | Batten |
| 2002/0076027 A1 | 6/2002 | Bernnan et al. |
| 2002/0077082 A1 | 6/2002 | Cruickshank |
| 2002/0078153 A1 | 6/2002 | Chung et al. |
| 2002/0080942 A1 | 6/2002 | Clapper |
| 2002/0082028 A1 | 6/2002 | Wittenkamp |
| 2002/0082030 A1 | 6/2002 | Berndt et al. |
| 2002/0082997 A1 | 6/2002 | Kobata et al. |
| 2002/0083462 A1 | 6/2002 | Arnott |
| 2002/0085515 A1 | 7/2002 | Jaynes et al. |
| 2002/0085687 A1 | 7/2002 | Contractor et al. |
| 2002/0085701 A1 | 7/2002 | Parsons et al. |
| 2002/0087469 A1 | 7/2002 | Ganesan et al. |
| 2002/0100798 A1 | 8/2002 | Farrugia et al. |
| 2002/0103864 A1 | 8/2002 | Rodman et al. |
| 2002/0103898 A1 | 8/2002 | Moyer et al. |
| 2002/0110121 A1 | 8/2002 | Mishra |
| 2002/0115471 A1 | 8/2002 | De Loye et al. |
| 2002/0122545 A1 | 9/2002 | Schwab et al. |
| 2002/0126817 A1 | 9/2002 | Hariri et al. |
| 2002/0128025 A1 | 9/2002 | Sin |
| 2002/0128033 A1 | 9/2002 | Burgess |
| 2002/0137507 A1 | 9/2002 | Winkler |
| 2002/0137530 A1 | 9/2002 | Karve |
| 2002/0138468 A1 | 9/2002 | Kermani |
| 2002/0146105 A1 | 10/2002 | McIntyre |
| 2002/0147777 A1 | 10/2002 | Hackbarth et al. |
| 2002/0147811 A1 | 10/2002 | Schwartz et al. |
| 2002/0152165 A1 | 10/2002 | Dutta et al. |
| 2002/0154210 A1 | 10/2002 | Ludwig et al. |
| 2002/0168055 A1 | 11/2002 | Crockett et al. |
| 2002/0177410 A1 | 11/2002 | Klein et al. |
| 2002/0178117 A1 | 11/2002 | Maguire et al. |
| 2002/0187794 A1 | 12/2002 | Fostick et al. |
| 2003/0005150 A1 | 1/2003 | Thompson et al. |
| 2003/0014488 A1 | 1/2003 | Dalal et al. |
| 2003/0035381 A1 | 2/2003 | Chen et al. |
| 2003/0036380 A1 | 2/2003 | Skidmore |
| 2003/0045309 A1 | 3/2003 | Knotts |
| 2003/0046071 A1 | 3/2003 | Wyman |
| 2003/0053612 A1 | 3/2003 | Henrikson et al. |
| 2003/0055735 A1 | 3/2003 | Cameron et al. |
| 2003/0055906 A1 | 3/2003 | Packham et al. |
| 2003/0058838 A1 | 3/2003 | Wengrovitz |
| 2003/0063732 A1 | 4/2003 | Mcknight et al. |
| 2003/0069874 A1 | 4/2003 | Hertzog et al. |
| 2003/0083040 A1 | 5/2003 | Ruth et al. |
| 2003/0092451 A1 | 5/2003 | Holloway et al. |
| 2003/0093700 A1 | 5/2003 | Yoshimoto et al. |
| 2003/0096626 A1 | 5/2003 | Sabo et al. |
| 2003/0097635 A1 | 5/2003 | Giannetti |
| 2003/0104827 A1 | 6/2003 | Moran et al. |
| 2003/0108172 A1 | 6/2003 | Petty et al. |
| 2003/0112928 A1 | 6/2003 | Brown et al. |

(56) References Cited

U.S. PATENT DOCUMENTS

| | | |
|---|---|---|
| 2003/0112952 A1 | 6/2003 | Brown et al. |
| 2003/0119532 A1 | 6/2003 | Hatch |
| 2003/0140004 A1 | 7/2003 | O'Leary et al. |
| 2003/0142798 A1 | 7/2003 | Gavette et al. |
| 2003/0147518 A1 | 8/2003 | Albal et al. |
| 2003/0149662 A1 | 8/2003 | Shore |
| 2003/0158860 A1 | 8/2003 | Caughey |
| 2003/0165223 A1 | 9/2003 | Timmins et al. |
| 2003/0167229 A1 | 9/2003 | Ludwig et al. |
| 2003/0169330 A1 | 9/2003 | Ben-Shachar et al. |
| 2003/0179743 A1 | 9/2003 | Bosik et al. |
| 2003/0179864 A1 | 9/2003 | Stillman et al. |
| 2003/0187992 A1 | 10/2003 | Steenfeldt et al. |
| 2003/0208541 A1 | 11/2003 | Musa |
| 2003/0217097 A1 | 11/2003 | Eitel |
| 2003/0228863 A1 | 12/2003 | Vander Veen et al. |
| 2004/0002350 A1 | 1/2004 | Gopinath et al. |
| 2004/0002902 A1 | 1/2004 | Muehlhaeuser |
| 2004/0019638 A1 | 1/2004 | Makagon et al. |
| 2004/0034700 A1 | 2/2004 | Polcyn |
| 2004/0037409 A1 | 2/2004 | Crockett et al. |
| 2004/0044658 A1 | 3/2004 | Crabtree et al. |
| 2004/0052356 A1 | 3/2004 | McKinzie et al. |
| 2004/0081292 A1 | 4/2004 | Brown et al. |
| 2004/0103152 A1 | 5/2004 | Ludwig et al. |
| 2004/0119814 A1 | 6/2004 | Clisham et al. |
| 2004/0127256 A1 | 7/2004 | Goldthwaite et al. |
| 2004/0156491 A1 | 8/2004 | Reding et al. |
| 2004/0184593 A1 | 9/2004 | Elsey et al. |
| 2004/0203942 A1 | 10/2004 | Dehlin |
| 2004/0208305 A1 | 10/2004 | Gross et al. |
| 2004/0236792 A1 | 11/2004 | Celik |
| 2004/0247088 A1 | 12/2004 | Lee |
| 2004/0249884 A1 | 12/2004 | Caspi et al. |
| 2004/0264654 A1 | 12/2004 | Reding et al. |
| 2005/0053206 A1 | 3/2005 | Chingon et al. |
| 2005/0053221 A1 | 3/2005 | Reding et al. |
| 2005/0102382 A1 | 5/2005 | MacGregor et al. |
| 2005/0117714 A1 | 6/2005 | Chingon et al. |
| 2005/0129208 A1 | 6/2005 | McGrath et al. |
| 2005/0149487 A1 | 7/2005 | Celik |
| 2005/0191994 A1 | 9/2005 | May et al. |
| 2005/0216421 A1 | 9/2005 | Barry et al. |
| 2005/0220286 A1 | 10/2005 | Valdez et al. |
| 2005/0243993 A1 | 11/2005 | McKinzie et al. |
| 2006/0093120 A1 | 5/2006 | Thorpe et al. |
| 2006/0095575 A1* | 5/2006 | Sureka et al. ............... 709/227 |
| 2006/0128409 A1 | 6/2006 | Gress et al. |
| 2006/0168140 A1 | 7/2006 | Inoue et al. |
| 2006/0276179 A1 | 12/2006 | Ghaffari et al. |
| 2006/0277213 A1 | 12/2006 | Robertson et al. |
| 2007/0021111 A1 | 1/2007 | Celik |
| 2009/0060155 A1 | 3/2009 | Chingon et al. |

FOREIGN PATENT DOCUMENTS

| | | |
|---|---|---|
| EP | 0818908 | 1/1998 |
| EP | 1014630 | 6/2000 |
| EP | 1017210 | 7/2000 |
| EP | 1028578 | 8/2000 |
| EP | 1161063 | 12/2001 |
| EP | 1193617 | 4/2002 |
| EP | 1235387 | 8/2002 |
| EP | 1294201 | 3/2003 |
| JP | 59-169264 | 9/1984 |
| JP | 02-260750 | 10/1990 |
| JP | 04-336742 | 11/1992 |
| JP | 05-316233 | 11/1993 |
| JP | 06-113020 | 4/1994 |
| JP | 07-030664 | 1/1995 |
| JP | 07-058856 | 3/1995 |
| JP | 07-107171 | 4/1995 |
| JP | 07-107549 | 4/1995 |
| JP | 07-123098 | 5/1995 |
| JP | WO-95/12948 | 5/1995 |
| JP | 08-149226 | 7/1996 |
| JP | 08-181763 | 7/1996 |
| JP | 08-298546 | 11/1996 |
| JP | 08-331642 | 12/1996 |
| JP | 09-064869 | 3/1997 |
| JP | 09-064977 | 3/1997 |
| JP | 09-083651 | 3/1997 |
| JP | 09-200350 | 7/1997 |
| JP | 09-223087 | 8/1997 |
| JP | 09-261759 | 10/1997 |
| JP | 09-294158 | 11/1997 |
| JP | 09-294163 | 11/1997 |
| JP | 10-013546 | 1/1998 |
| JP | 10-051555 | 2/1998 |
| JP | 10-155038 | 6/1998 |
| JP | 10-173769 | 6/1998 |
| JP | 10-336319 | 12/1998 |
| JP | 11-055407 | 1/1999 |
| JP | 11-127222 | 5/1999 |
| JP | 11-136316 | 5/1999 |
| JP | 11-187156 | 7/1999 |
| JP | 11-191800 | 7/1999 |
| JP | 11-266309 | 9/1999 |
| JP | 2000-032116 | 1/2000 |
| JP | 2000-134309 | 5/2000 |
| JP | 2000-165433 | 6/2000 |
| JP | 2000-196756 | 7/2000 |
| JP | 2000-224301 | 8/2000 |
| JP | 2000-270307 | 9/2000 |
| JP | 2000-349902 | 12/2000 |
| JP | WO-01/22751 | 3/2001 |
| JP | 2001-144859 | 5/2001 |
| JP | WO-01/35621 | 5/2001 |
| JP | 2001-156921 | 6/2001 |
| JP | 2001-197210 | 7/2001 |
| JP | 2001-197562 | 7/2001 |
| JP | 2001-243231 | 9/2001 |
| JP | 2001-298545 | 10/2001 |
| JP | WO-01/89212 | 11/2001 |
| JP | 2002-016673 | 1/2002 |
| JP | 2002-41522 | 2/2002 |
| JP | 2002-044123 | 2/2002 |
| JP | 2002-044257 | 2/2002 |
| JP | 2002-057807 | 2/2002 |
| JP | 2002-094696 | 3/2002 |
| JP | 2002-232575 | 8/2002 |
| JP | 2002-237893 | 8/2002 |
| JP | 2002-247148 | 8/2002 |
| JP | 2002-261834 | 9/2002 |
| JP | 2002-300290 | 10/2002 |
| JP | 2002-300306 | 10/2002 |
| WO | WO-96/14704 | 5/1996 |
| WO | WO-97/20423 | 6/1997 |
| WO | WO-97/33421 | 9/1997 |
| WO | WO-98/02007 | 1/1998 |
| WO | WO-99/22493 | 5/1999 |
| WO | WO-99/38309 | 7/1999 |
| WO | WO-00/45557 | 8/2000 |
| WO | WO-00/60837 | 10/2000 |
| WO | WO-00/64133 | 10/2000 |
| WO | WO-01/11586 | 2/2001 |
| WO | WO-01/52513 | 7/2001 |
| WO | WO-02/25907 | 3/2002 |
| WO | WO-02/43338 | 5/2002 |

OTHER PUBLICATIONS

"Business Solutions/Professional," http://www.accessline.com/business_sol/bs_professional_body.html, two pages, retrieved from the internet on Apr. 17, 2003.

Chapter 3: Overview, http://service.real.com/help/library/guides/g270/htmfiles/overview.htm, Dec. 2, 1999.

"Cisco Personal Assistant 1.4," Cisco Systems, http://www.cisco.com/en/US/products/sw/voicesw/ps2026/prod_presentation_list.html, pp. 1-12, Jun. 24, 2003.

"Click to Call," http://replay.waybackmachine.org/20020207142936/http://www.clicktocall.com/main.htm, Internet archive of website "www.clicktocall.com", dated Feb. 7, 2002.

(56) References Cited

OTHER PUBLICATIONS

"Data Connection Conferencing DC-H.323," http://web.archive.org/web/20001120050600/www.dataconnection.com/conf/h323.htm, Data Connection Ltd, four pages, Copyright 1998.
"Data Connection Conferencing DC-MeetingServer," Data Connection Ltd., http://web.archive.org/web/20000914200719/www.dataconnection.com/conf/meetingserver.htm, seven pages, Copyright 1998.
"Data Connection Conferencing DC-Recorder," Data Connection Ltd., http://web.archive.org/web/20001016055611/www.dataconnection.com/conf/recorder.htm, four pages, Copyright 1998.
Data Connection DC-VoiceNet Features, Data Connection Ltd., http://web.archive.org/web/20001016102614/www.dataconnection.com/messging/vnfeat.htm, four pages, Copyright 1998.
"Data Connection Directory Systems," Data Connection Ltd., http://www.dataconnection.com/inetapps/directory.htm, two pages, Copyright 1998.
"Data Connection Messaging Software Products and Services," Data Connection Ltd, http://web.archive.org/web/20000819063320/www.dataconnection.com/messging/messgidx.htm, four pages, Copyright 1998.
"Data Connection Messaging Systems—DC-IMS\Voice for Service Providers," Data Connection Ltd, http://web.archive.org/web/20010307174512/www.dataconnection.com/messging/spivoice.htm, two pages, Copyright 1998.
"Data Connection: Web Conferencing Solutions for Service Providers," Data Connection Ltd., http://web.archive.org/web/20021201144529/www.dataconnection.com/inetapps/conferencing.htm, four pages, Copyright 1998.
"DC-SurroundSuite for Service Providers," Data Connection Ltd., http://web.archive.org/web/20000914200355/www.dataconnection.com/messging/spssuite.htm, four pages Copyright 1998.
"DC-WebShare," Data Connection Ltd., http://web.archive.org/web/20001016115016/www.dataconnection.com/conf/webshare.htm, four pages, Copyright 1998.
Dec. 5, 2011 Canadian Office Action Issued in CA s/n 2,507,500.
"Directories Explained," Data Connection Ltd., http://www.dataconnection.com/inetapps/direxpl.htm, seven pages, Copyright 1998.
"eVoice FAQ—Premium Home Answer," http://content.evoice.com/wcs/signUp/FAQ_premHA_s01.htm, three pages, retrieved from the internet on Jul. 2, 2001.
File Transfer, Microsoft Windows Technologies Windows NetMeeting, http://www.microsoft.com/windows/netmeeting/features/files/default.asp, last updated Jun. 4, 1999.
"How Internet Radio Works," Howstuffworks, http://computer.howstuffworks.com/internet-radio.htm/printable, five pages, retrieved from the internet on Oct. 16, 2003.
"Instructions on Application Sharing and Data Collaboration," VCON Escort and Cruiser, http://www.vide.gatech.edu/docs/share/, 10 pages, retrieved from the internet on Oct. 6, 2003.
Instructions on Multipoint Application Sharing and Data Collaboration, VCON Escort and Cruiser with the RadVision MCU, http://www.vide.gatech.edu/docs/multi-share, six pages, retrieved from the Internet on Oct. 6, 2003.
"InteleScreener," http://www.intelescreener.com/howitworks.html, three pages, Copyright 2003.
"Macromedia SoundEdit 16 Support Center-Working with Other Programs, What is Shockwave Audio Streaming?" http://www.macromedia.com/support/soundedit/how/shock/whatis.html, two pages, retrieved from the internet on Oct. 24, 2003.
"MaiiNGen: Next Generation Messaging for Service Providers," Data Connection Ltd, http://www.dataconnection.com/messaging/, two pages, Copyright 2003-2004.
"MailNGen: Unified Messaging," Data Connection Ltd., http://www.dataconnection.com/messaging/unified_messaging.htm, two pages, Copyright 1998.
"MediaTone—The 'Dial Tone' for Web Communications Services,"Webex, nine pages, Copyright 2003.
"MeetingServer: Broadband for Learning Case Study," Data Connection Ltd, http://www.dataconnection.com/conferencing/meetingserver_casestudy.htm, three pages, Retrieved from the internet on Jul. 20, 2004.
"MeetingServer: The Award-winning Web Conferencing Solution for Service Providers," Data Connection Ltd., http://www.dataconnection.com/conferencing/, two pages, Copyright 1998.
"MeetingServer: The Web Conferencing Solution for Service Providers," Data Connection Ltd., http://www.dataconnection.com/conferencing/meetingserver.htm, two pages, Copyright 1998.
"MeetingServer: Web Conferencing Architecture," Data Connection Ltd, http://www.dataconnection.com/conferencing/meetingserver_arch.htm, two pages, Copyright 1998.
"MP3 Recorder Download—MP3 Recorder—Record Audio Stream to MP3 or WAV," http://www.mp3-recorder.net, three pages, Copyright 2002.
"NetMeeting101," Meeting by Wire, http://www.meetingbywire.com/NetMeeting101.htm, nine pages, retrieved from the internet on Oct. 6, 2003.
"NetMeeting102," Meeting by Wire, http://www.meetingbywire.com/NetMeeting102.htm, 11pages, retrieved from the internet on Oct. 6, 2003.
Data Connection, MailNGen, "Next Generation Messaging for Service Providers," Data Connection Limited, 2003.
Oct. 27, 2011 Canadian Office Action Issued in CA s/n 2,507,093.
Supplemental Report to Diary 53, Networking the Sound Digitizing Device, Old Colorado City Communications and the National Science Foundation Wireless Field Tests, http://wireless.oldcolo.com/biology/ProgressReports200, Oct. 20, 2002.
Telecommunications and Personal Management Services Linked in Collaboration by Verizon and Microsoft, http://www.microsoft.com/presspass/press/2001/oct01/10-23MSVerizonPr.asp, Oct. 23, 2001.
"TeleZapper from Privacy Technologies," Privacy Corps—Our Review, http://www.privacycorps.com/pages/product1.htm, eight pages, Copyright 2002.
"The Mobile Phone User Guide", http://www.mobileshop.org/usertech/wildfire.htm, Copyright 2003.
Voice-ASP, White Paper Technology and Processes, eVoice, Dec. 13, 2000.
Voice-ASP, White Paper: Market Opportunities for Enhanced Voicemail eVoice, Nov. 10, 2000.
"Data Connection DC-Share for UNIX," Data Connection Ltd., http://web.archive.org/web/20000914200713/www.dataconnection.com/conf/DCshare.htm, three pages, Copyright 1998.
"DC-SurroundSuite for Enterprises," Data Connection Ltd., http://web.archive.org/web/20010306082711/www.dataconnection.com/messging/enssuite.htm, four pages, Copyright 1998.
"DC-VoiceNet," Data Connection Ltd., http://web.archive.org/web/20000914200424/www.dataconnection.com/messging/vnet.htm, four pages, Copyright 1998.
"SmartDialer Functional Overview, Version v1.0," Internet Applications Group, Data Connection Ltd., 18 pages, Nov. 3, 2003.
A Proposal for Internet Call Waiting Service Using SIP, A. Brusilovsky et al., Lucent Technologies, PINT Working Group, Internet Draft, Jan. 1999.
Chou, "Inside SSL: The Secure Sockets Layer Protocol," IT Professional, vol. 4, Issue 4, pp. 47-52, Jul./Aug. 2002.
Cumming, "SIP Market Overview, An analysis of SIP Technology and The State of the SIP Market," Data Connection Ltd., 54 pages, Sep. 2003.
Day, et al., "A Model for Presence and Instant Messaging, RFC 2778," Network Working Group, 12 pages, Feb. 2000.
Derfle et al., "How Networks Work," Bestseller Edition, Ziff-Davis Press, pp. vi-ix, 1-3, 21-70, 190-198, Copyright 1996.
Gaedke, et al., "Web Content Delivery to Heterogeneous Mobile Platforms", Advances in Database Technologies, Lecture Notes in Computer Science (LNCS), vol. 1552, pp. 205-217, Nov. 16-19, 1998.
Gessler et al., "PDAs as Mobile WWW Browsers", Computer Networks and ISDN Systems, vol. 28, Issue 1-2, 10 pages, Dec. 1995.
Gralla, "How the Internet Works," Millennium Edition, Que Publishing, 35 pages, Copyright 1999.

(56) References Cited

OTHER PUBLICATIONS

James, "Integrating Voicemail Systems, A White Paper Describing the Integration of Heterogeneous Voicemail Systems," Internet Applications Group, Data Connection Ltd.,17 pages, Copyright 2004.

Kornowski, "Wildfire at Your Back and Call, A Voice-Activated Telephone Assistant That Minds You and Your Messages," http://www.lacba.org/lalawyer/techwildfire.html, printed Oct. 1, 2004.

Accessline Comms' Accessline Service, The One-Number Wonder, CommWeb, http://www.cconvergence.com/article/TCM20000504S0014, Feb. 1, 2000.

Kunz et al., "An Architecture for Adaptive Mobile Applications", 11th International Conference on Wireless Communications, pp. 1-12, May 13, 1999.

Lauff, et al., "Multimedia Client Implementation on Personal Digital Assistants", Fourth Conference on Applied Natural Language Processing (ANLP-94), pp. 1-13, Sep. 10-12, 1997.

From Dial Tone to Media Tone, Analyst: R. Mahowald, IDC, Jun. 2002.

Muller, "Calendar Scheduling Teleconference Communication Mechanism," IBM Technical Disclosure Bulletin, IBM Corporation, vol. 37, No. 3, p. 561, Mar. 1, 1994.

Muller, "Desktop Encyclopedia of the Internet," Artech House, Inc., 51 pages, Copyright 1999.

Odenwald, "Real-Time Collaboration Integration in the Portal," SAP Design Guild, http://www.sapdesignguild.org/editions/edition5/synch_collab.asp, 10 pages, retrieved from the Internet on Oct. 6, 2003.

Wagner, et al., "Analysis of the SSL 3.0 Protocol," Proceedings of the 2nd Conference on Proceedings of the Second Usenix Workshop on Electronic Commerce (WOEC'96 ) vol. 2, 12 pages, Nov. 1996.

White, "How Computers Work," Millennium Edition, Que Publishing, 83 pages, Sep. 1999.

* cited by examiner in Ser. No. 10/720,868, entitled "METHODS AND SYSTEMS FOR DIREC-
INTERACTIVE ASSISTANT FOR MANAGING TELEPHONE COMMUNICATIONS

RELATED APPLICATIONS

This application is a division of U.S. application Ser. No. 11/156,134, filed Jun. 17, 2005, now U.S. Pat. No. 8,467,502, which is a continuation-in-part application of U.S. patent application Ser. No. 10/721,005, entitled "METHODS AND SYSTEMS FOR CALL MANAGEMENT WITH USER INTERVENTION," filed Nov. 24, 2003, now U.S. Publication No. 2005-0117714 A1, first published on Jun. 2, 2005, which application is a continuation-in-part of U.S. patent application Ser. No. 10/083,793, entitled "METHOD AND APPARATUS FOR CALENDARED COMMUNICATIONS FLOW CONTROL," filed Feb. 27, 2002, now U.S. Publication No. 2004-0101121 A1, first published on May 27, 2004; U.S. patent application Ser. No. 10/083,792, entitled "VOICE MAIL INTEGRATION WITH INSTANT MESSENGER," filed Feb. 27, 2002, now U.S. Publication No. 2004-0076272 A1, first published on Apr. 22, 2004; U.S. patent application Ser. No. 10/083,884, entitled "DEVICE INDEPENDENT CALLER ID," filed Feb. 27, 2002; and U.S. patent application Ser. No. 10/083,822, entitled "METHOD AND APPARATUS FOR A UNIFIED COMMUNICATION MANAGEMENT VIA INSTANT MESSAGING," filed Feb. 27, 2002, all of which claim priority to U.S. Provisional Patent Application No. 60/272,122, filed Feb. 27, 2001; U.S. Provisional Patent Application No. 60/272,167, filed Feb. 27, 2001; U.S. Provisional Patent Application No. 60/275,667, filed Mar. 13, 2001; U.S. Provisional Patent Application No. 60/275,719, filed Mar. 13, 2001; U.S. Provisional Patent Application No. 60/275,020, filed Mar. 13, 2001; U.S. Provisional Patent Application No. 60/275,031, filed Mar. 13, 2001; and U.S. Provisional Patent Application No. 60/276,505, filed Mar. 19, 2001. U.S. patent application Ser. No. 10/721,005, entitled "METHODS AND SYSTEMS FOR CALL MANAGEMENT WITH USER INTERVENTION," filed Nov. 24, 2003, now U.S. Publication No. 2005-0117714 A1, first published on Jun. 2, 2005 also claims priority under 35 U.S.C. §119(e) to U.S. Provisional Patent Application No. 60/428,704, entitled "DIGITAL COMPANION," filed Nov. 25, 2002; and U.S. Provisional Patent Application No. 60/436,018, entitled "DIGITAL COMPANION," filed Dec. 26, 2002. The contents of each of the above-listed patent applications are expressly incorporated herein by reference in their entireties.

U.S. application Ser. No. 11/156,134 is also a continuation-in-part application of U.S. patent application Ser. No. 10/084,121, entitled "CALENDAR-BASED CALLING AGENTS," filed Feb. 27, 2002. The present application is also a continuation-in-part application of U.S. patent application Ser. No. 10/720,661, entitled "METHODS AND SYSTEMS FOR DRAG AND DROP CONFERENCE CALLING," filed Nov. 24, 2003; U.S. patent application Ser. No. 10/720,859, entitled "METHODS AND SYSTEMS FOR CONFERENCE CALL BUFFERING," filed Nov. 24, 2003, now U.S. Publication No. 2005-0053214 A1, first published on Mar. 10, 2005; U.S. patent application Ser. No. 10/721,009, entitled "METHODS AND SYSTEMS FOR COMPUTER ENHANCED CONFERENCE CALLING," filed Nov. 24, 2003, now U.S. Publication No. 2004-0208303 A1, first published on Oct. 21, 2004; U.S. patent application Ser. No. 10/720,943, entitled "METHODS AND SYSTEMS FOR REMOTE CALL ESTABLISHMENT," filed Nov. 24, 2003, now U.S. Publication No. 2005-0053217 A1, first published on Mar. 10, 2005; U.S. patent application Ser. No. 10/720,868, entitled "METHODS AND SYSTEMS FOR DIRECTORY INFORMATION LOOKUP," filed Nov. 24, 2003, now U.S. Publication No. 20050053220 A1, first published on Mar. 10, 2005; U.S. patent application Ser. No. 10/720,970, entitled "METHODS AND SYSTEMS FOR AUTOMATICALLY FORWARDING CALLS TO CELL PHONE," filed Nov. 24, 2003, now U.S. Publication No. 2004-0213212 A1, first published on Oct. 28, 2004; U.S. patent application Ser. No. 10/720,952, entitled "METHODS AND SYSTEMS FOR ADAPTIVE MESSAGE AND CALL NOTIFICATION," filed Nov. 24, 2003, now U.S. Publication No. 2005-0053221 A1, first published on Mar. 10, 2005; U.S. patent application Ser. No. 10/720,870, entitled "METHODS AND SYSTEMS FOR A CALL LOG," filed Nov. 24, 2003, now U.S. Publication No. 2005-0117729 A1, first published on Jun. 2, 2005; U.S. patent application Ser. No. 10/720,633, entitled "METHODS AND SYSTEMS FOR AUTOMATIC FORWARDING OF CALLS TO A PREFERRED DEVICE," filed Nov. 24, 2003, now U.S. Pat. No. 6,799,605, first issued on Oct. 5, 2004; U.S. patent application Ser. No. 10/720,971, entitled "METHODS AND SYSTEMS FOR MULTI-LINE INTEGRATED DEVICE OR LINE MANAGEMENT," filed Nov. 24, 2003, now U.S. Publication No. 2005-0105510 A1, first published on May 19, 2005; U.S. patent application Ser. No. 10/720,784, entitled "METHODS AND SYSTEMS FOR CONTACT MANAGEMENT," filed Nov. 24, 2003; U.S. patent application Ser. No. 10/720,920, entitled "METHODS AND SYSTEMS FOR NOTIFICATION OF CALL TO PHONE DEVICE," filed Nov. 24, 2003, now U.S. Publication No. 2004-0264654 A1, first published on Dec. 30, 2004; U.S. patent application Ser. No. 10/720,825, entitled "METHODS AND SYSTEMS FOR SINGLE NUMBER TEXT MESSAGING," filed Nov. 24, 2003; U.S. patent application Ser. No. 10/720,944, entitled "METHODS AND SYSTEMS FOR MULTI-USER SELECTIVE NOTIFICATION," filed Nov. 24, 2003, now U.S. Publication No. 2004-0156491 A1, first published on Aug. 12, 2004; U.S. patent application Ser. No. 10/720,933, entitled "METHODS AND SYSTEMS FOR CPN TRIGGERED COLLABORATION," filed Nov. 24, 2003, now U.S. Publication No. 2005-0084087 A1, first published on Apr. 21, 2005; and U.S. patent application Ser. No. 10/720,938, entitled "METHODS AND SYSTEMS FOR PREEMPTIVE REJECTION OF CALLS," filed Nov. 24, 2003, now U.S. Publication No. 2005-0053206 A1, first published on Mar. 10, 2005, all of which claim priority to U.S. Provisional Patent Application No. 60/436,018, filed Dec. 26, 2002. Each of the patent applications listed above is expressly incorporated herein by reference in their entireties.

U.S. application Ser. No. 11/156,134 is also a continuation-in-part application of U.S. patent application Ser. No. 10/858,973, entitled "METHODS AND SYSTEMS FOR INTEGRATING COMMUNICATIONS SERVICES," filed Jun. 2, 2004, which claims priority under 35 U.S.C. §119(e) to U.S. Provisional Patent Application No. 60/428,704, entitled "DIGITAL COMPANION," filed Nov. 25, 2002; and U.S. Provisional Patent Application No. 60/475,047, filed Jun. 2, 2003. Each of the patent applications listed above is expressly incorporated herein by reference in their entireties.

BACKGROUND INFORMATION

A wide variety of means exist for communication between users. For example, a user may conduct phone calls via a home phone, work phone, and mobile phone. In addition, users may also communicate using devices such as PC's, PDA's, pagers, etc. using manners of communicating such as email and instant messaging.

Unfortunately, managing such a wide variety of communication means can be difficult. In particular, as a user changes location, communication with the user may vary. For example, while on travel, it may only be possible to reach a user by mobile phone. However, the user may best be reached by email while at work. Also, the user may wish to implement various rules for receiving and controlling communications. For example, to be reached at home, the user may want the home phone to ring three times before forwarding the call to a mobile phone. As another example, the user may wish to be paged each time an email is received from a particular person while away from the office.

A user may also wish to treat a phone call differently dependent on who is calling the user. For example, if a user receives a call from a caller that the user does not want to speak to at the moment, the user may want to send that call directly to voice mail. Also, if a user receives a call from a number that displays no caller ID information or that the user otherwise does not recognize, the user may wish to somehow specially treat the call because the caller is a potential telemarketer.

Current call management systems make it possible for a user to receive notification of a call on a communications device, and then to either take the call or divert it to voice mail to the users discretion. Current call management systems also make it possible to automatically intercept and specially treat a call that displays no caller ID information.

Current call management systems, however, do not enable a user to perform other functions as a call is being received, such as forwarding a phone call received on one device to another device, manually initiating protection from telemarketers, or otherwise managing a call in real-time. Accordingly, there is a need for a method and system for a method and system for managing calls in real-time with user intervention.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF EXEMPLARY EMBODIMENTS

Overview

Methods and systems for managing telephone calls in real-time based on input from a user are disclosed. According to one of many possible embodiments, a service center receives information pertaining to a call to the user from a service control point. The service center also retrieves data corresponding to the user using the information pertaining to the call and sends a notification of the call to a device associated with the user. The device is determined based on the retrieved data. Based on a response to the notification from the user, the service center instructs the service control point to connect the call by providing the service control point with response information reflective of the response. The service control point thereafter receives the response information from the service center and connects the call based on the response information.

According to another embodiment, at least one chat function is provided. The chat function allows users to "chat" with callers prior to determining the dispositions of incoming calls from the callers. This allows users to make educated call disposition decisions.

According to another embodiment, conference-call functions are provided. The conference call functions allow users manage conference calls on a participant-by-participant basis. In one embodiment for example, users are able to individually mute or unmute conference call participants, without affecting the settings associated with other call participants.

Network Environment

Figure 1:
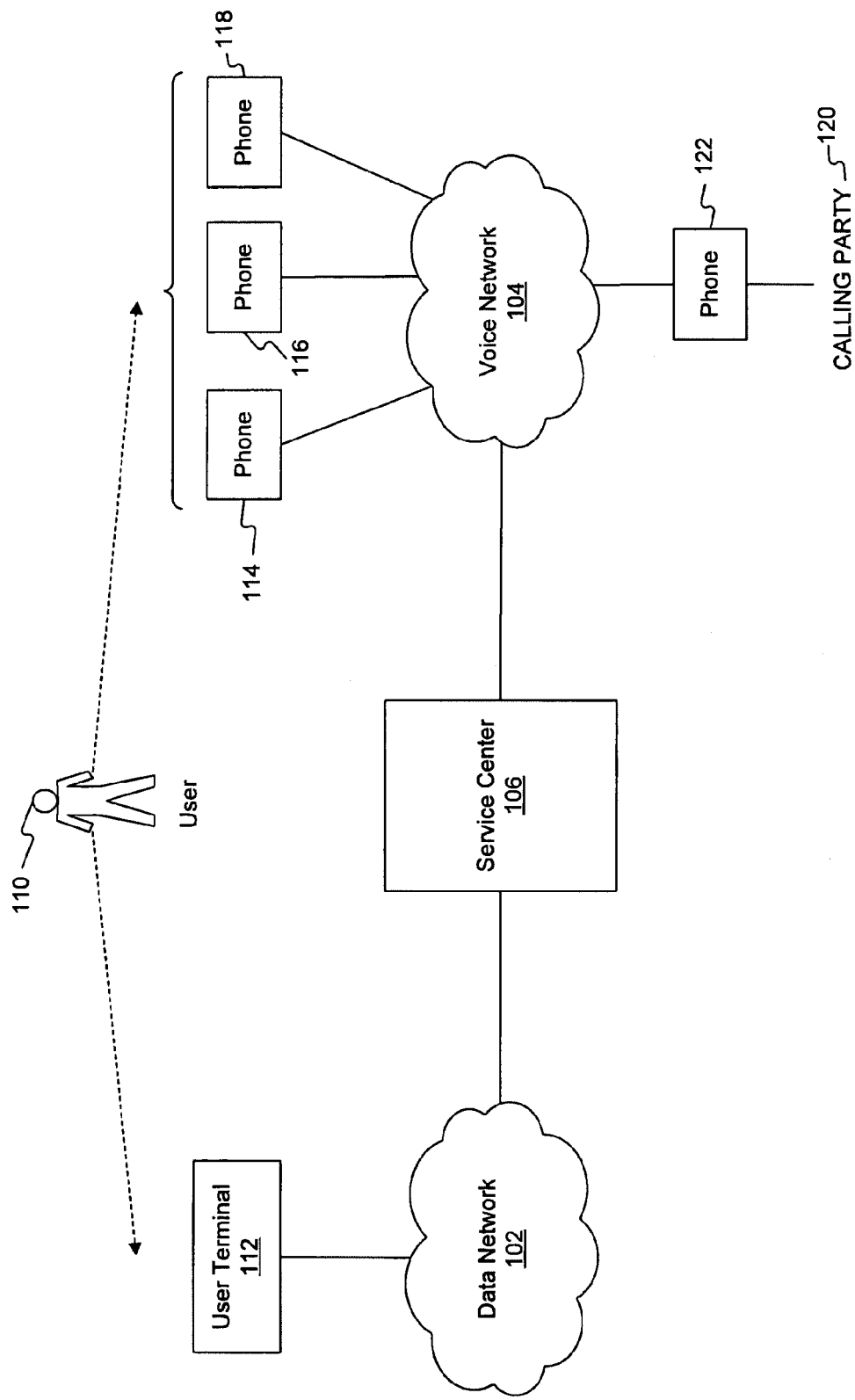
FIG. 1 is a diagram of an exemplary data processing and telecommunications environment in which features and aspects consistent with the principals of the present invention may be implemented.

FIG. 1 is a block diagram of a data processing and telecommunications environment 100, in which features and aspects consistent with the present invention may be implemented. The number of components in environment 100 is not limited to what is shown and other variations in the number of arrangements of components are possible, consistent with embodiments of the invention. The components of FIG. 1 may be implemented through hardware, software, and/or firmware. Data processing and telecommunications environment 100 may include a data network 102, a voice network 104, and a service center 106. A user 110 may use a user terminal 112 to interface with data network 102 and may use phones 114, 116, and 118 to interface with voice network 104.

Calling party 120 may use phone 122 to call a user, such as user 110, at any one of phones 114, 116, and 118.

Data network 102 provides communications between the various entities depicted in environment 100 of FIG. 1, such as user terminal 112 and service center 106. Data network 102 may be a shared, public, or private network and encompass a wide area or local area. Data network 102 may be implemented through any suitable combination of wired and/or wireless communication networks. By way of example, data network 102 may be implemented through a wide area network (WAN), local area network (LAN), an intranet and/or the Internet. Further, the service center 106 may be connected to multiple data networks 102, such as, for example, to a wireless carrier network and to the Internet.

Voice network 104 may provide telephony services to allow a calling party, such as calling party 120, to place a telephone call to user 110. In one embodiment, voice network 104 may be implemented using a network, such as the Public Switched Telephone Network ("PSTN"). Alternatively, voice network 104 may be implemented on a voice over broadband network, such as a network using voice-over Internet Protocol ("VoIP") technology. Additionally, in other embodiments, the voice network may be a video over broadband network, such as, for example, a network for providing 2-way video communications. In another example, the voice network may be a wireless broadband network, such as, for example, a network using WiFi (i.e., IEEE 802.11(b) and/or (g)). In yet another example, the voice network 104 may be a wireless voice network(s), such as, for example, a cellular or third-generation cellular network). In addition, voice network 104 may be implemented using any single or combination of the above-described technologies consistent with the principles of the present invention. Further, service center 106 may be connected to multiple voice networks 104, such as for example, Verizon's™ Voice Network, voice networks operated by other carriers, and wireless carrier networks.

Service center 106 provides a platform for managing communications over data network 102 and voice network 104. Service center 106 also provides gateway functions, such as code and protocol conversions, to transfer communications between data network 102 and voice network 104. Service center 106 may be implemented using a combination of hardware, software, and/or firmware. For example, service center 106 may be implemented using a plurality of general purpose computers or servers coupled by a network (not shown). Although service center 106 is shown with direct connections to data network 102 and voice network 104, any number and type of network elements may be interposed between service center 106, data network 102, and voice network 104.

User terminal 112 provides user 110 an interface to data network 102. For example, user terminal 112 may be implemented using any device capable of accessing the Internet, such as a general purpose computer or personal computer equipped with a modem. User terminal'112 may also be implemented in other devices, such as the Blackberry™, and Ergo Audrey™. Furthermore, user terminal 112 may be implemented in wireless devices, such as pagers, mobile phones (with data access functions), and Personal Digital Assistants ("FDA") with network connections.

User terminal 112 also allows user 110 to communicate with service center 106. For example, user 110 may use instant messaging ("IM") to communicate with service center 106. In addition, user terminal 112 may use other aspects of TCP/IP including the hypertext transfer protocol ("HTTP"); the user datagram protocol ("UDP"); the file transfer protocol ("FTP"); the hypertext markup language ("HTML"); and the extensible markup language ("XML").

Furthermore, user terminal 112 may communicate directly with service center 106. For example, a client application may be installed on user terminal 112, which directly communicates with service center 106. Also, user terminal 112 may communicate with service center 106 via a proxy.

Phones 114, 116, 118, and 122 interface with voice network 104. Phones 114, 116, 118, and 122 may be implemented using known devices, including wireline phones and mobile phones. Although phones 114, 116, 118, and 122 are shown directly connected to voice network 104, any number of intervening elements, such as a private branch exchange ("PBX"), may be interposed between phones 114, 116, 118, and 122 and voice network 104.

Figure 2:
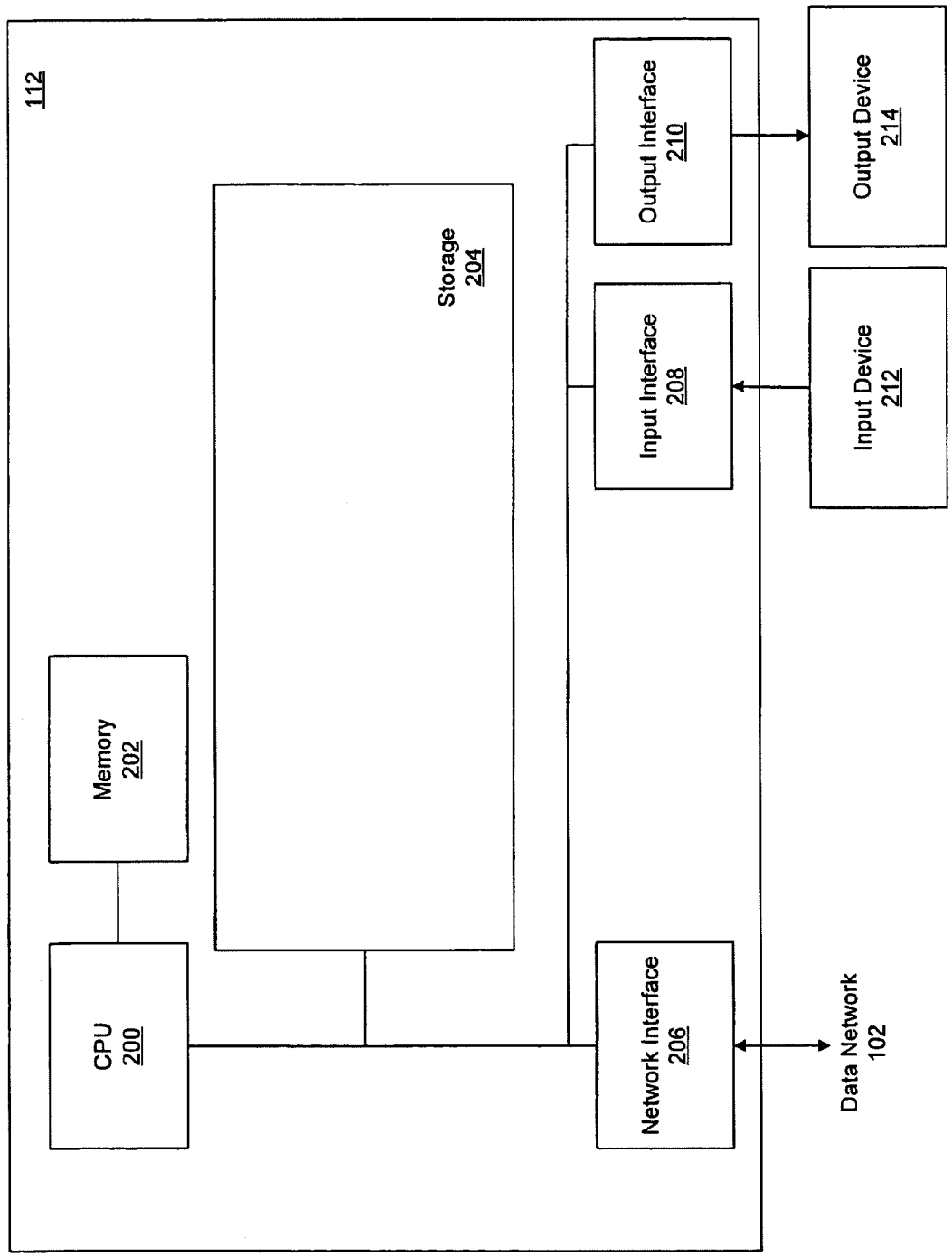
FIG. 2 is a diagram of an exemplary user terminal, consistent with the principals of the present invention.

FIG. 2 is a block diagram of a user terminal consistent with the present invention. User terminal 112 may include a central processing unit (CPU) 200, a memory 202, a storage module 204, a network interface 206, an input interface 208, an output interface 210, an input device 216, and an output device 218.

CPU 200 provides control and processing functions for user terminal 112. Although FIG. 2 illustrates a single CPU, user terminal 112 may include multiple CPUs. CPU 200 may also include, for example, one or more of the following: a co-processor, memory, registers, and other processing devices and systems as appropriate. CPU 200 may be implemented, for example, using a Pentium™ processor provided from Intel Corporation.

Memory 202 provides a primary memory for CPU 200, such as for program code. Memory 202 may be embodied with a variety of components of subsystems, including a random access memory ("RAM") and a read-only memory ("ROM"). When user terminal 112 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 may provide mass storage for user terminal 112. Storage module 204 may be implemented with a variety of components or subsystems including, for example, a hard drive, an optical drive, CD ROM drive, DVD drive, a general-purpose storage device, a removable storage device, and/or other devices capable of storing information. Further, although storage module 204 is shown within user terminal 112, storage module 204 may be implemented external to user terminal 112.

Storage module 204 includes program code and information for user terminal 112 to communicate with service center 106. Storage module 204 may include, for example, program code for a calendar application, such as GroupWise provided by Novell Corporation or Outlook provided by Microsoft Corporation; a client application, such as a Microsoft Network Messenger Service (MSNMS) client or America Online Instant Messenger (AIM) client; and an Operating System (OS), such as the Windows Operation System provided by Microsoft Corporation. In addition, storage module 204 may include other program code and information, such as program code for TCP/IP communications; kernel and device drivers; configuration information, such as a Dynamic Host Configuration Protocol (DHCP) configuration; a web browser, such as Internet Explorer provided by Microsoft Corporation, or Netscape Communicator provided by Netscape Corporation; and any other software that may be installed on user terminal 112.

Network interface 206 provides a communications interface between user terminal 112 and data network 102. Network interface 206 may receive and transmit communications for user terminal 112. For example, network interface 206 may be a modem, or a local area network ("LAN") port.

Input interface 208 receives input from user 110 via input device 212 and provides the input to CPU 200. Input device 212 may include, for example, a keyboard, a microphone, and a mouse. Other types of input devices may also be implemented consistent with the principles of the present invention.

Output interface 210 provides information to user 110 via output device 214. Output device 214 may include, for example, a display, a printer, and a speaker. Other types of output devices may also be implemented consistent with the principles of the present invention.

Figure 3:
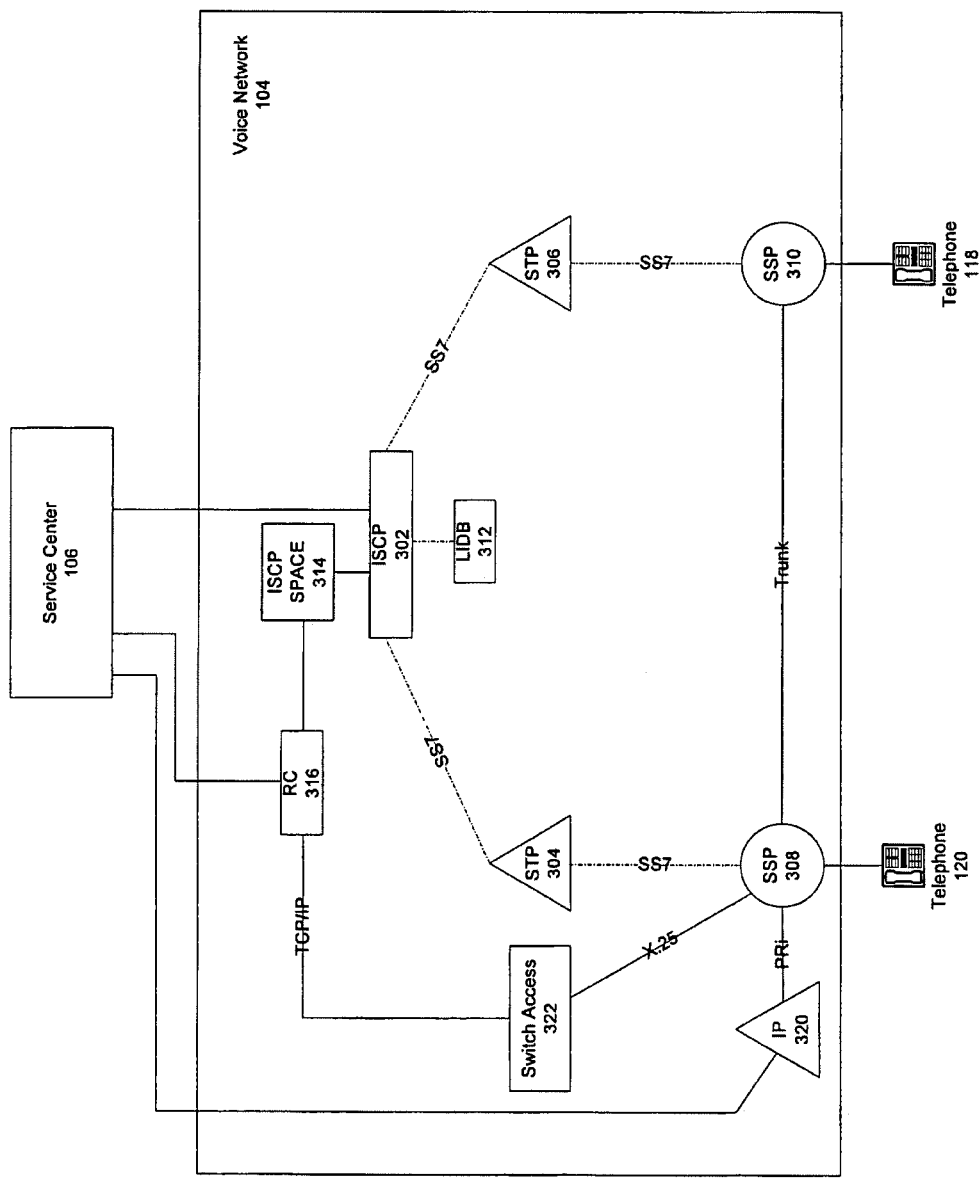
FIG. 3 is a diagram of a voice network, consistent with the principles of the present invention.

FIG. 3 is a diagram of a voice network, consistent with the principles of the present invention. As shown, voice network 104 includes an intelligent service control point (ISCP) 302, service transfer points (STP) 304 and 306, service switching points (SSP) 308 and 310, a line information database (LIDB) 312, an ISCP Service Provisioning And Creation Environment (SPACE) 314, a Recent Change Environment 316, an Intelligent Peripheral (IP) 320, and a switch access 322. Although this embodiment of a voice network 104 is described as a PSTN, as discussed above in other embodiments, the voice network 104 may be, for example, a voice or video over broadband network a wireless broadband, a wireless voice network, etc.

Voice network 104 may be implemented using the PSTN and SS7 as a signaling protocol. The SS7 protocol allows voice network 104 to provide features, such as call forwarding, caller-ID, three-way calling, wireless services such as roaming and mobile subscriber authentication, local number portability, and toll-free/toll services. The SS7 protocol provides various types of messages to support the features of voice network 104. For example, these SS7 messages may include Transaction Capabilities Applications Part ("TCAP") messages to support event "triggers," and queries and responses between ISCP 302 and SSPs 308 and 310.

ISCP 302 may also be, for example, a standard service control point (SCP), an Advanced Intelligent Network (AIN) SCP, a soft switch, or any other network call controller. ISCP 302 provides translation and routing services of SS7 messages to support the features of voice network 104, such as call forwarding. In addition, ISCP 302 may exchange information with the service center 106 using TCP/IP or SS7. ISCP 302 may include service logic used to provide a switch, such as SSP 308 or 310, with specific call processing instructions. ISCP 302 may also store data related to various features that a user may activate. Such features may include, for example, call intercept and voice mail. ISCP 302 may be implemented using a combination of known hardware and software. ISCP 302 is shown with a direct connection to service center 106 and a connection to ISCP SPACE 314, however, any number of network elements including routers, switches, hubs, etc., may be used to connect ISCP 302, ISCP SPACE 314, and service center 106. Further, information exchanged between the ISCP 302 and service center 106 may use, for example, the SR-3389 General Data Interface (GDI) for TCP/IP.

STPs 304 and 306 relay SS7 messages within voice network 104. For example, STP 304 may route SS7 messages between SSPs 308 and 310. STP 304 or 306 may be implemented using known hardware and software from manufacturers such as NORTEL™ and LUCENT Technologies™.

SSPs 308 and 310 provide an interface between voice network 104 and phones 114 and 120, respectively, to setup, manage, and release telephone calls within voice network 104. SSPs 308 and 310 may be implemented as a voice switch, an SS7 switch, or a computer connected to a switch. SSPs 308 and 310 exchange SS7 signal units to support a telephone call between calling party 120 and user 110. For example, SSPs 308 and 310 may exchange SS7 messages, such as TCAP messages, within message signal units ("MSU") to control calls, perform database queries to configuration database 312, and provide maintenance information.

Line Information Database (LIDB) 312 comprises one or more known databases to support the features of voice network 104. For example, LIDB 312 may include subscriber information, such as a service profile, name and address, and credit card validation information. Although, in this figure, LIDB 312 is illustrated as directly connected to ISCP 302, LIDB 312 may be connected to ISCP 302 through an STP (e.g., 304 and 306). Additionally, this communication link may use, for example, the GR-2838 General Dynamic Interface (GDI) for SS7.

ISCP Service Provisioning and Creation Environment (SPACE) 314 may be included as part of the ISCP 302 or be separate from the ISCP 302. For example, the Telcordia™ ISCP may include an environment similar to SPACE 314 as part of the product. Further, ISCP SPACE 314 may include one or more servers. ISCP SPACE 314 is the point in the ISCP platform where customer record updates may be made.

In one embodiment, customer records may be stored in the ISCP SPACE 314 such that the records may be updated and sent to the ISCP 302. These records may include information regarding how to handle calls directed to the customer. For example, these customer records may include information regarding whether or not calls for the customer are to be forwarded to a different number, and/or whether or not the call should be directed to an IP, such as a voice mail system, after a certain number of rings. Additionally, one ISCP SPACE 314 may provide updates to one or more ISCPs 302 via an ISCP network (not shown).

Additionally, the voice network 104 may include one or more recent change engines 316 such as, for example, an Enterprise Recent Change engine (eRC); an Assignment, Activation, and Inventory System (AAIS); or a multi-services platform (MSP). As an example, the eRC and AAIS may be used in voice networks 104 located in the western part of the United States, while an MSP may be used in networks in the eastern part. The recent change engines may be used to update switch and ISCP databases. For example, a recent change engine may deliver database updates to SSPs and to ISCPs, such that when updating databases, these recent change engines emulate human operators. Additionally, if the instructions are to be sent to an ISCP 302, the recent change engine may first send the instructions to the ISCP SPACE 314, which then propagates the instructions to the ISCP 302 as discussed above. Further, an MSP or eRC may be used, for example, for providing updates to both the SSPs 308 or 310 and the ISCPs 302. Or, for example, an eRC may be used for providing updates to the SSPs 308 or 310, while an AAIS is used for providing updates to the ISCPs 302.

Updates sent to the SSPs 308 or 310 may be sent from the recent change engine 316 via a switch access 322 that may, for example, convert the updates into the appropriate protocol for the SSP 308 or 310. For example, recent change engine 316 may send updates to the SSPs 308 or 310 via TCP/IP. The switch access 322 may then convert the updates from TCP/IP to X.25. This switch access 322 may be implemented using hardware and/or software. These connections may include any number of elements, such as, for example, switches, routers, hubs, etc. and may be, for example, an internal data network for the voice network 104.

The voice network 104 may also include one or more intelligent peripherals (IP). For example, in FIG. 3, an IP 320 is illustrated as being connected to SSP 308. These IPs may be used for providing functions for interaction between users and the voice network, such as voice mail services, digit collection, customized announcements, voice recognition, etc. Moreover, the communications between the SSP 308 and IP 320 may use the Primary Rate interface (PRi) (e.g., the 1129 protocol) protocol. Additionally, the IP 320 may be capable of sending and receiving information to/from the Service Center 106. These communications may use, for example, the SR-3511 protocol. Further, although FIG. 3 illustrates this connection as a direct connection, this connection may include any number of elements including routers, switches, hubs, etc., and may be via, for example, an internal data network for the voice network 104.

Figure 4:
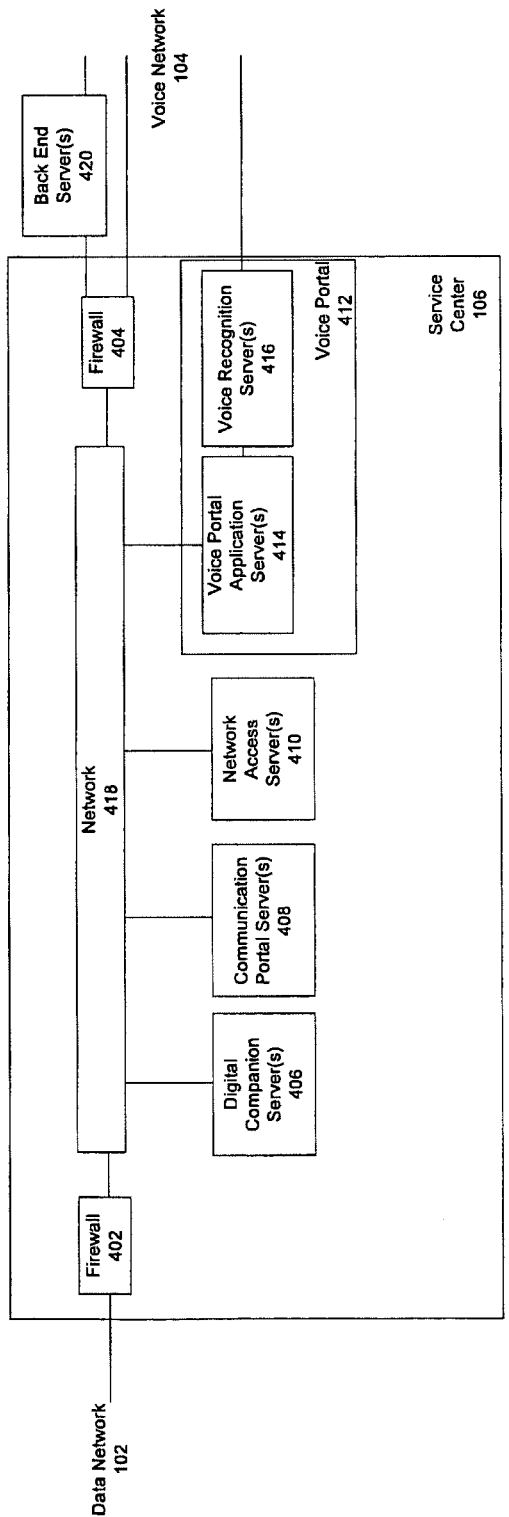
FIG. 4 is a block diagram of a service center, consistent with the principles of the present invention.

FIG. 4 is a block diagram of a service center, consistent with the principles of the present invention. As shown, service center 106 may include firewalls 402 and 404, one or more digital companion servers 406, one or more communication portal servers 408, one or more network access servers 410, and a voice portal 412. The voice portal 412 may include a voice portal application server 414 and a voice recognition server 416. A network 418 may be used to interconnect the firewalls and servers. Additionally, back end server(s) 420 may be provided between the service center 106 and the voice network 104.

Firewalls 402 and 404 provide security services for communications between service center 106, data network 102, and voice network 104, respectively. For example, firewalls 402 and 404 may restrict communications between user terminal 112 and one or more servers within service center 106. Any appropriate security policy may be implemented in firewalls 402 and 404 consistent with the principles of the present invention. Firewalls 402 and 404 may be implemented using a combination of known hardware and software, such as the Raptor Firewall provided by the Axent Corporation. Further, firewalls 402 and 404 may be implemented as separate machines within service, center 106, or implemented on one or more machines external to service center 106.

Network 418 may be any type of network, such as an Ethernet or FDDI network. Additionally, network 418 may also include switches and routers as appropriate without departing from the scope of the invention. Further, additional firewalls may be present in the network 418, for example, to place one or more of servers 406, 408, 410, or voice portal 412 behind additional firewalls.

Each server (406, 408, 410, 414, 416, 420) may be any appropriate type of server or computer, such as a Unix or DOS-based server or computer. The servers may implement various logical functions, such as those described below. In FIG. 4, a different server is illustrated as being used for each logical function. In other embodiments, the logical functions may be split across multiple servers, multiple servers may be used to implement a single function, all functions may be performed by a single server, etc.

In general, a digital companion server 406 may provide the software and hardware for providing specific services of the service center. Exemplary services include, for example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling party's number, setting up conference calls on-line, real-time call management, etc. In one embodiment, real-time call management enables a user to perform several functions as a call is being received, such as sending a call to voice mail, sending a call received on one device to another device, manually initiating protection from telemarketers, playing an announcement for the caller, scheduling a call back, bridging a caller onto a current call, etc.

A communication portal server 408 may provide the hardware and software for managing a customer's account and interfacing with customer account information stored by the provider of customer's voice network 104. The network access servers 410 may provide the hardware and software for sending and receiving information to the voice network 104 in processing the applications provided by the service center. For example, the network access servers 410 may be used for transmitting and/or receiving information from/to an ISCP 302 or an SSP 308 or 310 of the voice network 104.

The voice portal 412 includes software and hardware for receiving and processing instructions from a customer via voice. For example, a customer may dial a specific number for the voice portal 412. Then the customer using speech may instruct the service center 105 to modify the services to which the customer subscribes. The voice portal 412 may include, for example, a voice recognition function 416 and an application function 414. The voice recognition function 416 may receive and interpret dictation, or recognize spoken commands. The application function 414 may take, for example, the output from the voice recognition function 416, convert it to a format suitable for the service center 106 and forward the information to one or more servers (406, 408, 410) in the service center 106.

Figure 5:
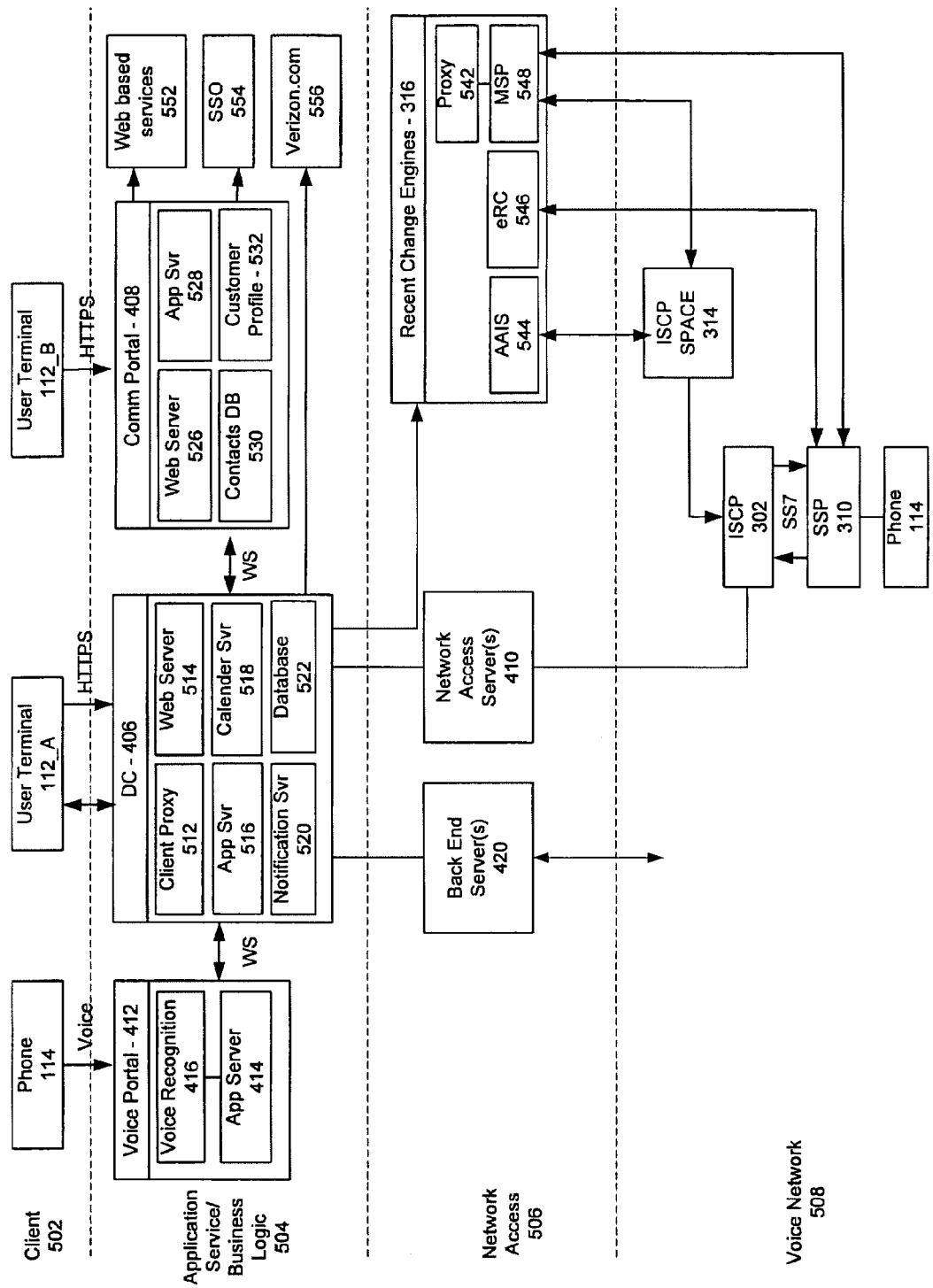
FIG. 5 illustrates a logical architecture of an exemplary system, consistent with the present invention.

FIG. 5 illustrates a logical architecture of an exemplary system, consistent with the present invention. As illustrated, the logical architecture may be split into four planes: client side 502, application service 504, network access 506, and the voice network 508.

Client side 502 includes user terminals 112_A and 112_B that a user may use to send and/or receive information to/from the service center 106. Additionally, client side 502 includes the user's phone(s) 114. As discussed above, user terminals 112 may be any type of device a user may use for communicating with Service Center 106. For example, user terminal 112_A may be a PDA running a program for communicating with the Service Center 106, while user terminal 112_B may be a desktop type computer running a web browser for communicating with the Service Center 106 via the Internet. Additionally, the user may have one or more phones 114, such as, for example, one or more standard landline telephones and/or wireless phones.

The application service plane 504 includes the digital companion server(s) 406, communication portal server(s) 408, and the voice portal 412. These entities may communicate between one another using, for example, web services or any other suitable protocols. Web services are a standardized way of integrating Web-based applications using the Extensible Markup Language (XML), Simple Object Access Protocol (SOAP), Web Services Description Language (WSDL) and Universal Description, Discovery and Integration (UDDI) open standards over an Internet protocol (IP) backbone.

As illustrated, a digital companion server 406 may provide the following functions: a client proxy 512, a web server 514, an application server function 516, a calendar server function 518, a notification server function 520, and a database function 522. Each of these functions may be performed in hardware, software, and/or firmware. Further, these functions may each be executed by a separate server, split across multiple servers, included on the same server functions, or any other manner.

The client proxy function 512 provides a proxy function for the digital companion that may be used for security purposes. This client proxy function 512 may be included in a separate server such that all communications sent from the other digital companion functions/servers to a user terminal 112 via the data network 102 go through the client proxy 512. Also, if the client proxy 512 is included on a separate server, for example, an additional firewall may be provided between the client proxy 512 and the other digital companion servers to provide additional security.

Web server 514 provides functionality for receiving traffic over the data network 102 from a customer. For example, web server 514 may be a standard web server that a customer may access using a web browser program, such as Internet Explorer or Netscape Communicator.

Application server function 516 encompasses the general functions performed by the digital companion server(s) 406. For example, these functions may include interfacing with the various other digital companion functions to perform specific services provided by the service center. These services may include, for example, interfacing with other function(s), software, and/or hardware to provide a customer with the capability of managing their calls online. For example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling party's number, setting up conference calls on-line, enabling call management with user intervention in real-time, etc.

Additionally, the application server function 516 may interface with one or more external devices, such as an external web server, for retrieving or sending information. For example, the application server function 516 may interface with a voice network's data center 556 (e.g., verizon.com) to determine the services to which the customer subscribes (e.g., call waiting, call forwarding, voice mail, etc.).

Calendar server function 518 may provide the capability of scheduling events, logging when certain events occurred, triggering the application-functions to perform a function at a particular time, etc.

Notification server function 520 provides the capability to send information from the service center 106 to a user terminal 112. For example, the notification server function 520 at the direction of the application server function 516 may send a notification to the user terminal 112 that the user is presently receiving a phone call at the user's phone 114. This notification may be, for example, an instant message pop-up window that provides an identification of the caller as well as the number being called. The notification may also have a number of user-selectable buttons or items associated with it that enable the user to manage a call in real-time.

Database function 522 provides the storage of information useable by the various applications executed by the digital companion servers. These databases may be included in, for example, one or more external storage devices connected to the digital companion servers. Alternatively, the databases may be included in storage devices within the digital companion servers themselves. The storage devices providing the database function 522 may be any type of storage device, such as for example, CD-ROMs, DVD's, disk drives, magnetic tape, etc.

As discussed above, the communication portal server(s) 408 provide the hardware and software for managing a customer's account and interfacing with customer account information stored by the provider of customer's voice network 104. As illustrated in FIG. 5, a communication portal server 408 may provide the following functions: a web server function 526, an application server function 528, a contacts database function 530, and/or a customer profile function 532. Each of these functions may be performed by a separate server, split across multiple servers, included on the same server functions, or any other manner.

Web server function 526, as with web server function 514 of the digital companion servers, provides functionality for receiving traffic over the data network 102 from a customer. For example, the web server may be a standard web server that a customer may access using a web browser, such as Internet Explorer or Netscape Communicator.

The application server function 528 encompasses the general functions performed by the communication portal servers 408. For example, these functions may include interfacing with the voice network to retrieve and/or modify customer profile information, and creating and editing an address book for the user. Additionally, the application server function 528 may include the functionality of sending and/or receiving information to/from external servers and/or devices. For example, the communication portal servers 408 may be connected to a network, such as, the Internet. The application server function 528 may then provide connectivity over the Internet to external servers 552 that provide web services, such as the Superpages web page. The application server function 528 could then contact these external services 552 to retrieve information, such as an address for a person in the user's address book.

In another example, the application server function 528 of the communication portal 408 may interface a single sign on (SSO) server 554. SSO 554 may be used to allow users to access all services to which the user subscribes, on the basis of a single authentication that is performed when they initially access the network.

Moreover, the application server function 528, similar to application server 516, may provide functionality to facilitate services performed by the service center. These services may include, for example, interfacing with other function(s), software, and/or hardware to provide a customer with the capability of managing their calls online. For example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling party's number, setting up conference calls on-line, enabling call management with user intervention in real-time, etc.

The contacts database 530 includes storage devices for storing an address book for the user. This address book may be any appropriate type of address book. For example, the user's address book may include the names, phone numbers, and addresses of people and/or organizations. These storage devices may be internal or external to the communication portal servers 406 or some combination in between. In addition, these storage devices may be any type of storage device, such as magnetic storage, memory storage, etc.

The customer profile database 532 includes storage devices for storing customer profile information for the user. These storage devices may be the same or separate storage devices used for the contacts database. The customer profile may include information regarding the user's account for their voice network. For example, this information may include the user's name, billing address, and other account information. Additionally, the customer profile may include information regarding voice services to which the user subscribes, such as, for example, call waiting, voice mail, etc.

The application services plane 504 of the architecture may also include a voice portal 412. As discussed above, the voice portal 412 may include, for example, a voice recognition function 416 and an application server function 414, and be used for receiving and processing instructions from a customer via voice. The voice recognition function may be implemented using hardware and/or software capable of providing voice recognition capabilities. This hardware and/or software may be a commercially available product, such as the Voice Application platform available from Tellme Networks, Incorporated. The application server function 414 of the voice portal 412 may include hardware and/or software for exchanging information between the digital companion servers 406 and the voice recognition function 416. Additionally, the application server function 414 may be included on a separate server, included in the hardware and software providing the voice recognition function 416, included in the digital companion servers 406, etc.

The Network Access plane 506 of the architecture includes the functions for providing connectivity between the application service plane 502 and the voice network 104. For example, this plane may include the recent change engines 316, network access servers 410, and/or back end servers 420.

As discussed above, recent change engines 316 may be used to update switches and ISCP databases included in the voice network 104. In one embodiment, the recent change engines 316 may include an AAIS 544, an eRC 546, and/or an MSP 548. Additionally, a proxy 542 may be used between the digital companion servers 406 and the recent change engines 542 for security purposes.

The network access servers 410 may be included in the service center 106 and may provide the hardware and software for sending and receiving information to the voice network 410 in processing the applications provided by the service center. For example, the network access servers 410 may include a Caller ID (CID) functionality for retrieving caller ID information from the voice network 104, a click to dial (CTD) functionality for instructing an intelligent peripheral (IP) in the voice network to place a call via an SSP, and/or a real time call management (RTCM) functionality for interfacing with an ISCP of the voice network. Network access servers 410 may include equipment such as a VSR1000 call processing platform from Thinkengine Networks, Inc. of Marlborough, Mass.

Network Access plane 506 may also include one or more back end server(s) 420. These back end server(s) 420 may include hardware and/or software for interfacing the service center 106 and the voice network 104. The back end server(s) 420 may be connected to the service center 106 by a network, by a direct connection, or in any other suitable manner. Further, the back end server(s) 420 may connect to one or more devices in the voice network 104 by a network, a direct connection, or in any other suitable manner.

The back end server(s) 420 may include, for example, a server providing a voice mail retrieval and notification function. This voice mail retrieval and notification function may include the capability to receive notifications when a user receives a voice mail, physically call a user's voice mail system, enter the appropriate codes to retrieve the voice mail, retrieve the voice mail, convert the voice mail to a digital file, and send it to the digital companion servers 406.

Additionally, these back end server(s) 420 may also include, for example, a directory assistance server. This directory assistance server may interface the service center 106 with a Reverse Directory Assistance Gateway (RDA Gateway) of the voice network 104. An RDA Gateway is a device for issuing requests to a Data Operations Center (DOC) of the voice network 104 for name and/or address information associated with a phone number and receiving the name and/or phone number in response to this request.

In another example, the back end server(s) 420 may include a wireless internet gateway that is used for interfacing with a mobile switching center (MSC) of a wireless voice network. As with the above-described back end server(s) 420, this wireless internet gateway may be used for converting requests and information between the formats used by the service center 106 and those used by the wireless voice network.

In yet another example, the back end server(s) 420 may include a conference blasting server for instructing a conference bridge in the voice network 106 to dial out via an SSP to the participants of a voice conference. Alternatively, for example, the back end server(s) may include a server for instructing an IP of the voice network to place a call between two parties by dialing out to each of the parties. The back end server(s) may also include the capability to instruct the bridge or IP device to call an audio digitizing device that can listen to the conference, convert the audio signals to digital format, and forward the digitized signals to a user device via, for example, an audio streaming server. The audio streaming server may, for example, allow a user to connect to it via, for example, the Internet. Additionally, the audio streaming device may buffer or record the signals to permit the user to pause, rewind, and/or fast-forward thru the conference.

In yet another example, the back end server(s) 420 may include a Single Number Short Message Service (SN SMS) server for interfacing the service center 106 with a Short Message Service (SMS) gateway in the voice network 104. This may be used to permit the customer to have SMS messages addressed to their home phone number directed to an SMS capable device of the users choosing.

The voice network plane 508 includes the hardware and software included in the voice network 104, as discussed above with reference to FIG. 3. For example, the voice network plane 508 may include the ISCP SPACE 314, the ISCP 302, the intelligent peripherals 320, and the SSP 308. Additionally, the voice network plane 508 may also include the hardware and software included in a wireless carrier's network, such as, for example, the mobile switching center, etc.

Figure 6:
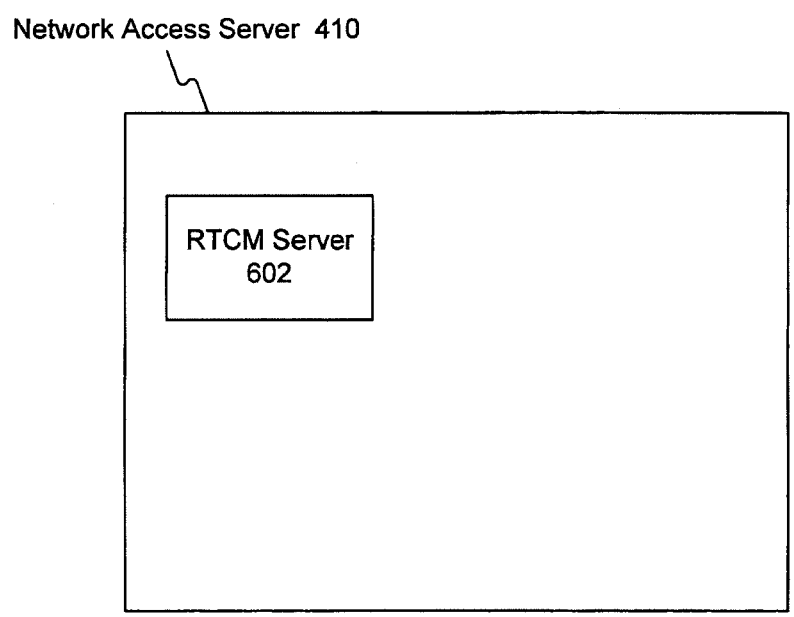
FIG. 6 is a diagram of an exemplary network access server consistent with the principles of the present invention.

FIG. 6 shows an exemplary network access server 410 consistent with the present invention. As noted above in conjunction with FIGS. 4 and 5, network access server 410 may include functionality that enables real-time call management. Real-time call management (RTCM) server 602 may be used to perform this functionality. RTCM server 602 may include one or more session initiation protocol (SIP) servers (not shown). For example, RTCM server 602 may facilitate call management by receiving information indicative of an incoming call from an ISCP 302, forwarding a request related to that information to digital companion server 406, receiving a response to the request, and causing the ISCP 302 to connect the call based on the response. One of ordinary skill in the art will recognize that other functionality may also be included in a network access server 410 in addition to RTCM server 602.

Figure 7:
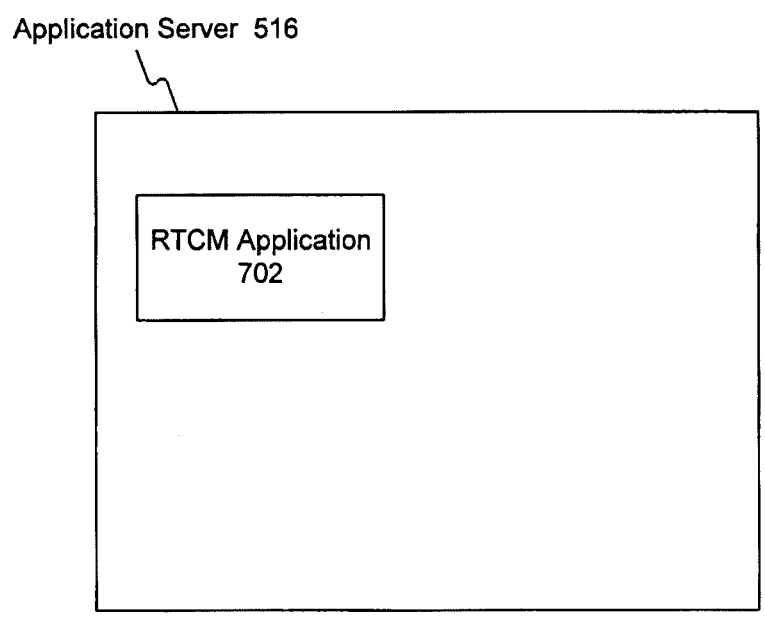
FIG. 7 is a diagram of an exemplary application server consistent with the principles of the present invention.

FIG. 7 shows an exemplary application server 516 consistent with the present invention. As noted above in conjunction with FIG. 5, application server 516 may include functionality that facilitates real-time call management. RTCM application 702 may be used to perform this functionality. For example, RTCM application 702 may facilitate call management by receiving a request corresponding to an incoming call, looking up customer-specific information, and providing information to a notification server that may notify a customer of an incoming call and present the customer with several options on handling the call. One of ordinary skill in the art will recognize that other functionality may also be included in an application server 516 in addition to RTCM application 702. One of ordinary skill in the art will also recognize that RTCM application 702 may be located in application server 528 instead of or in addition to application 516.

Real-Time Call Management

Figure 8:
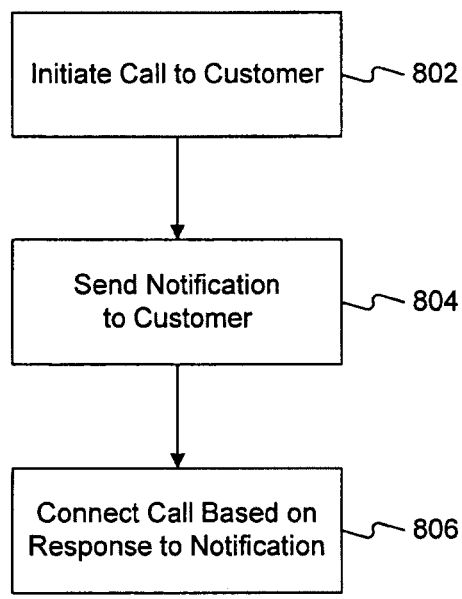
FIG. 8 is a diagram of an exemplary flowchart of a method for real-time call management in a manner consistent with the present invention.

FIG. 8 is a diagram of an exemplary flowchart of a method for real-time call management in a manner consistent with the present invention. Although the steps of the flowchart are described in a particular order, one skilled in the art will appreciate that these steps may be performed in a modified or different order. Further, one or more of the steps in FIG. 8 may be performed concurrently or in parallel.

As illustrated in FIG. 8, a calling party first initiates a call to a digital companion customer (step 802). For example, calling party 120 may use a phone, such as phone 122, to call a digital companion customer, such as user 110. In response to the initiation of a call, service center 106 may send a notification of the incoming call to the customer at a communications device (step 804). The notification may present a number of customer-selectable options associated with it that enable the customer to manage a call in real-time. For example, the notification may present different options that permit a customer to send a call to voice mail, send a call received on one device to another device, perform a call screening operation, accept a call, play an announcement, place a call on hold, schedule a call back operation, perform an automatic call back operation, or bridge the caller onto the current call. Once the customer selects one of the call management options (e.g., by pressing an appropriate button on a touch-sensitive display), service center 106 causes the call to be connected based on the customer's response to the notification (step 806).

Figure 9A:
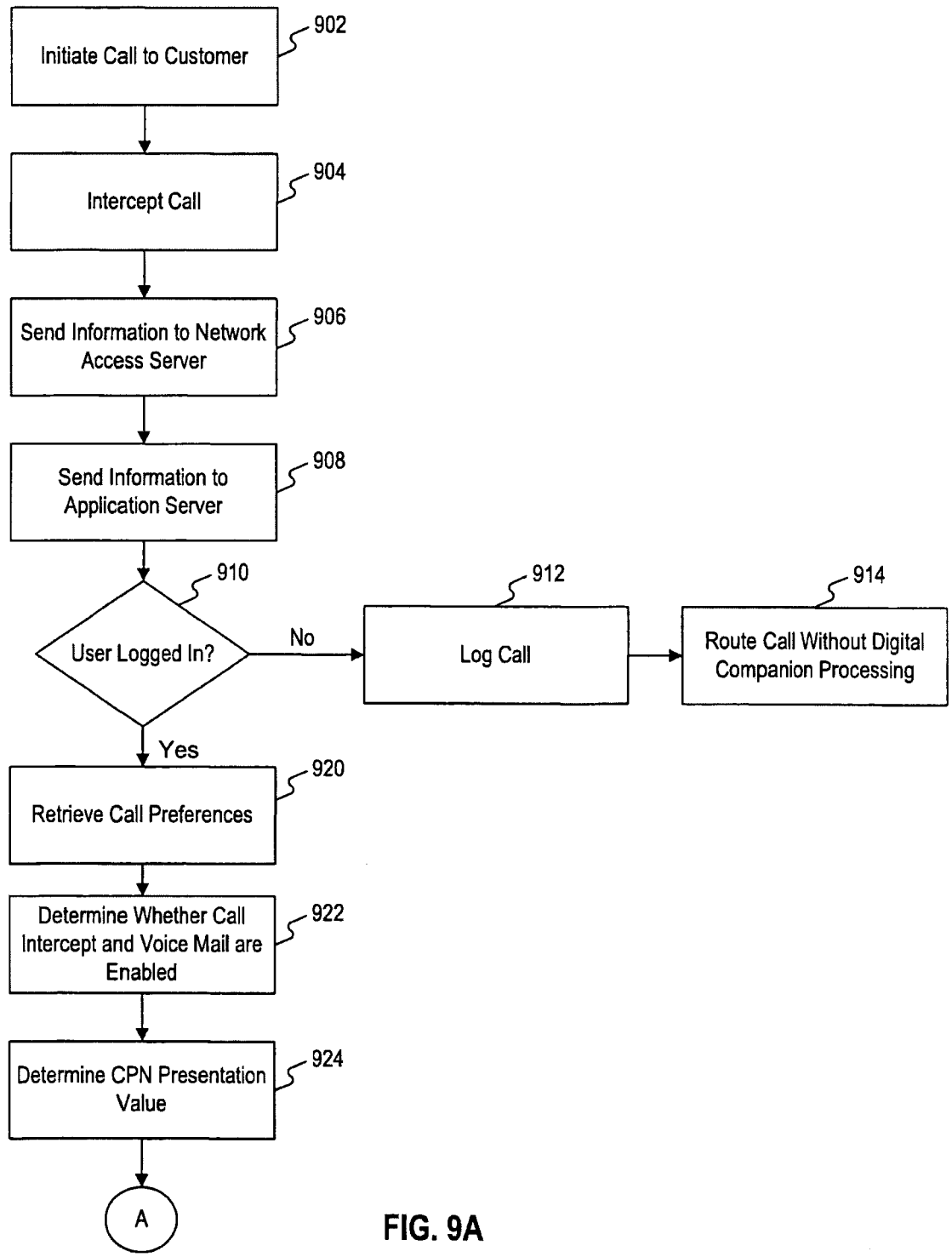
FIGS. 9A and 9B comprise another diagram of an exemplary flowchart of a method for real-time call management in a manner consistent with the present invention.
Figure 9B:
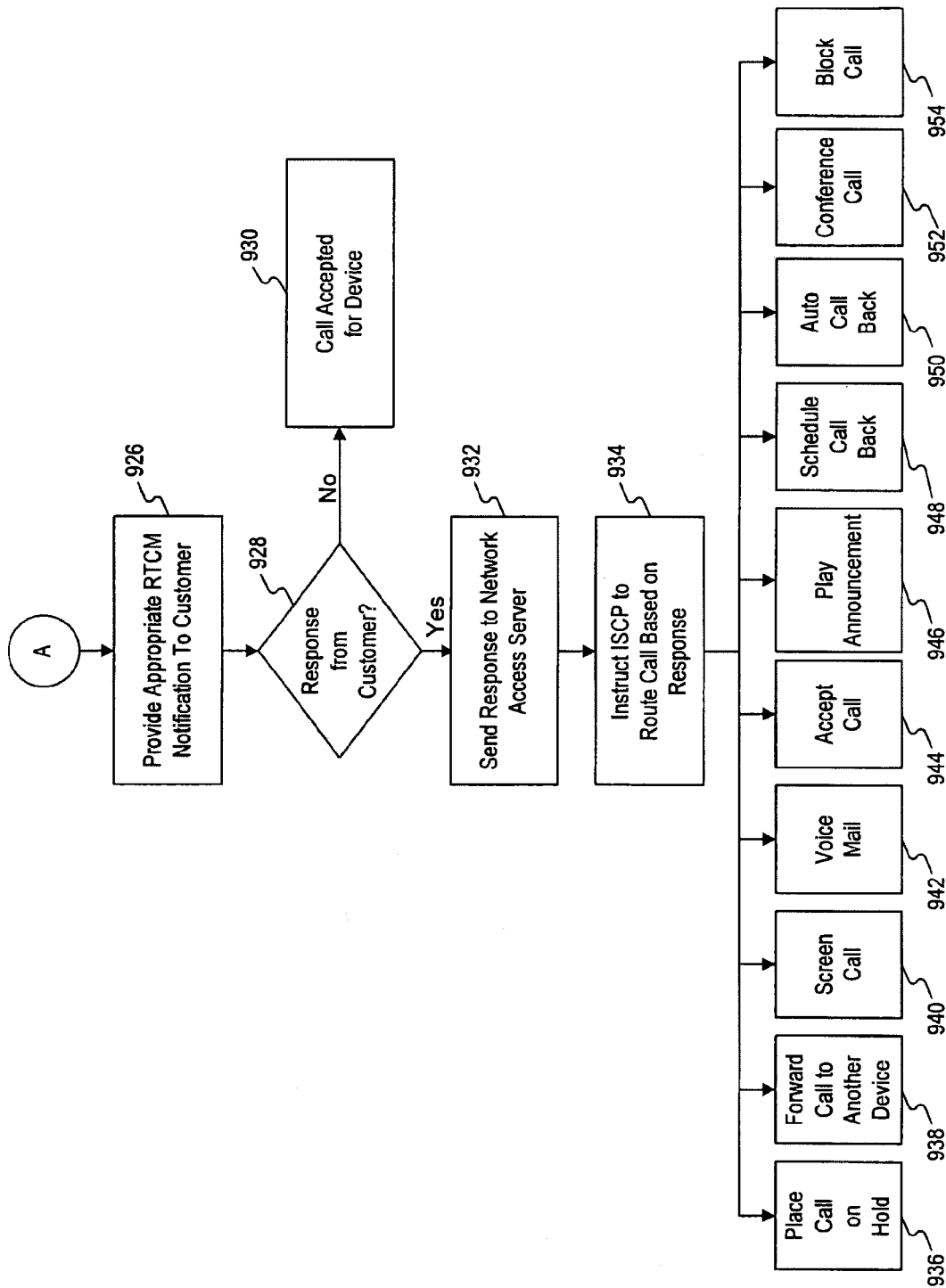

FIGS. 9A and 9B comprise an expanded diagram of an exemplary flowchart of a method for real-time call management in a manner consistent with the present invention. Although the steps of the flowchart are described in a particular order, one skilled in the art will appreciate that these steps may be performed in a modified or different order. Further, one or more of the steps in FIG. 9 may be performed concurrently or in parallel.

As illustrated in FIGS. 9A and 9B, a calling party first initiates a call to a digital companion customer (step 902). For example, calling party 120 may use a phone, such as phone 122, to call a digital companion customer, such as user 110. In one embodiment, the call may be routed from a phone to a voice network, such as voice network 104, where an SSP 308 or 310 may intercept the call (step 904). The SSP 308 or 310 may intercept the call because it encountered a trigger, such as a terminating attempt trigger or a specific digit string trigger, associated with the call. For example, a trigger may be set at SSP 308 or 310 on each of the lines corresponding to a digital companion customer. In this manner, a trigger is set to detect calls received at the SSP that are directed to telephone numbers of digital companion customers. In addition, triggers may be set on lines corresponding to digital companion customers that have the real-time call management feature enabled. As such, calls to telephone numbers associated with digital companion customers having real-time call management are detected by the triggers. For the purposes of this description, it is those calls that the SSP intercepts. In an alternative environment, such as a soft switch environment, functionality similar to a trigger may be utilized to intercept calls.

After intercepting the call, SSP 308 or 310 sends a query to ISCP 302 requesting further instructions. In response, ISCP 302 sends call information to a network access server 410 (step 906). More particularly, ISCP 302 may send call information to RTCM server 602. In one embodiment, the call information may be sent to network access server 410 via a Generic Data Interface (GDI), using a message structure associated with GDI (e.g., GetData, SendData, or InvokeApp). The call information sent to RTCM server 602 may also be sent in an encrypted form.

The call information may include, for example, call state data, a call intercept parameter, a voice mail parameter, time zone data, user ID, called number data, calling name data, calling number data, and calling party number (CPN) presentation information. One of ordinary skill in the art will appreciate that additional information may be included with the call information, or that some of the previously noted information may be omitted from the call information.

Call state data may provide the current call state based on processing (e.g., AIN processing) that has already occurred for the call. For example, some possible values for call state data may be indicative of a call being authorized for termination, a call being to a call intercept (CI) service node or IP, a call being from a CI service node or IP, a call being a priority call from the CI service node or IP, a call having a CI error encountered on a call to a CI service node or IP, or a call being on the first leg of a click-to-dial call.

The call intercept parameter identifies when a customer has call intercept. In one embodiment, a call intercept feature allows a customer to stop invalid numbers that typically appear as "unavailable," "private," "anonymous," or "out of area" on a caller ID display. The feature may tell callers that unidentified calls are not accepted and ask them to record a name. If an unidentified caller does not record a name or enter an override code, the called party's phone will not ring, thus eliminating interruptions from unidentified callers.

The voice mail parameter identifies when a subscriber has voice mail capability. Time zone data refers to the customer's time zone. Called number data refers to the number of a called device associated with the subscriber. User ID refers to a parameter that may have one of two values. If a distinctive ring feature is present, then user ID is set to a primary number value. If no such feature is present, then user ID is set to the same value as the called number. Distinctive ring, for example, may provide a customer with additional telephone numbers on a single line, with their own unique ringing pattern. A customer's primary number is the main number associated with the line.

Calling number data refers to the number of the caller. This parameter may contain such a number when it is available. In addition, the parameter may contain a calling party address when the information is made available by a previously executed AIN service. Otherwise, the calling number parameter may include some arbitrary string of digits or characters (e.g., ten zeros) when the caller ID information does or does not match a particular format.

Calling name data refers to the name of the calling party. This parameter may be retrieved, for example, by ISCP 302 from a database such as LIDB 312. It may be typically possible to retrieve the calling name when the database was populated with this data by a previously executed AIN service. If the calling name is not successfully retrieved, then the calling name parameter may include, for example, an arbitrary string of digits or characters (e.g., zeros) indicative of situations where there was no response from LIDB 312, there was an erroneous response from LIDB 312, there was no name returned from LIDB 312, the format of the caller ID is not in conformance, or the caller ID presentation is restricted.

ISCP 302 also sends an announcement to an SSP where the call is being handled. The announcement can be some kind of recording that is played for the calling party. This announcement has the effects of preventing a call timer in the SSP from expiring and giving the calling party an indication that the call is progressing. The ISCP 302 may continue to cause the announcement to be played while waiting for a response from the RTCM server 602.

Upon receiving the call information from the ISCP 302, the RTCM server 602 may decrypt the information, if necessary, and forward the received information to application server 516 (step 908). For example, the RTCM server 602 may dispatch the received call information to RTCM application 702. The RTCM application 702 may then determine whether the customer associated with the triggered phone number (e.g., destination/dialed phone number) is logged into the digital companion system (step 910). RTCM application 702 makes this determination, for example, by performing a lookup in a database, such as database 522, using the called number as an index. Based on the called number, RTCM application 702 can determine a digital companion customer ID. This digital companion customer ID may have a number of access points (e.g., user terminals 112) associated with it. RTCM application 702 may lookup entries in database 522 that correspond to the digital companion customer ID to determine whether the customer is currently logged onto the system using any access points. For example, whenever a customer is logged onto the system using an access point, an indication of such is stored in database 522. If RTCM application 702 finds such an indication in database 522, then it knows that the customer is logged on, and it knows which access point the customer is using.

If the customer is not logged on anywhere, then there is no way for service center 106 to communicate with the customer using digital companion operations. Instead, service center 106 logs the call (step 912). When the customer logs in at a later time, the customer is provided with an indication that the customer was called. Calls may be logged, for example, in database 522 or in other storage on digital companion server 406 or communication portal server 408. The call may be subsequently routed without digital companion processing (e.g., call may be completed as dialed, if possible) (step 914).

If the customer is logged on, then RTCM application 702 retrieves call preference information from a database (step 920). In one embodiment, the database storing this call preference information may be database 522, customer profile database 532, or another database used to stored customer-related data. The call preference information may include, for example, call block lists, lists of forwarding devices or telephone numbers, voice mail preferences, lists of recordings that the customer can set as pre-recorded messages, etc.

RTCM application 702 may also proceed to determine whether the call intercept feature and/or voice mail features are enabled for the called party by examining the call information received from the RTCM server 602 (step 922). RTCM application 702 makes this determination so that it knows which options should be made available to a called party using RTCM. One of ordinary skill in the art will appreciate that the RTCM application 702 may also check for any other feature that can be enabled and disabled (e.g., call screening). RTCM application 702 also determines the CPN presentation value associated with the call by examining the call information received from the RTCM server 602 (step 924). The CPN presentation value is determined so that the calling party's CPN information can either be displayed or not displayed for the customer.

Thereafter, RTCM application 702 may provide the collected information (e.g., call information, call preference information, and access point information) to notification server 520 and instruct notification server 520 to send an RTCM notification to the customer associated with the called number (e.g., by providing an indication of the access point that the customer is using to the notification server 520). Notification server 520 has open connections to all devices (e.g., user terminals 112) that are logged on. When notification server 520 receives information from RTCM application 702, it uses the information to route an RTCM notification to the customer at the appropriate access point (step 926). In one embodiment, the RTCM notification may be sent using a protocol such as HTTP (Hypertext Transfer Protocol), Java, or a similar protocol.

As noted above with reference to FIG. 8, the RTCM notification may be a notification of the incoming call to the customer. The notification may include a display having a number of customer-selectable buttons associated with it that enable the customer to manage a call in real-time. For example, the notification may have different buttons that permit a customer to send a call to voice mail, send a call received on one device to another device, perform a call screening operation, accept a call, play an announcement, place a call on hold, schedule a call back operation, perform an automatic call back operation, perform a call block operation, or bridge a caller onto the current call (e.g., initiate a conference call). The notification may include information for creating/selecting an appropriate user interface at the device in order to display the information and customer-selection buttons indicated by the notification.

The notification may provide the customer with different options dependent on the features for which the customer is authorized and has enabled. For example, if the customer does not have call intercept enabled, then the RTCM notification will not include a user-selectable area corresponding to the telemarketer zap operation. If the customer does not have voice mail enabled, then the RTCM notification will not include a user-selectable area corresponding to voice mail. One of ordinary skill in the art will appreciate that any feature that can be enabled and disabled may be used as a basis for altering the RTCM notification (e.g., call screening, conference call, etc.).

Once it has received the RTCM notification, the customer's selected device displays the RTCM notification, including the customer-selectable buttons associated with it. The device does not yet ring. Even though the device is not yet ringing, the caller may hear on the calling device (e.g., the phone or other device used to place the call) a ringing tone or an announcement indicating that the call is proceeding. RTCM server 602 then waits for a response from the customer (step 928). Response information may include, for example, call disposition information, forwarding number information, nature of forwarding number information, carrier access code, announcement type, and ring cadence. One of ordinary skill in the art will appreciate that additional data may be included with the response data, or that some of the previously noted data may be omitted from the response data.

Call disposition information may provide an indication of the customer's choice for how the call should be handled. For example, call disposition information may include an indication of sending a call to voice mail, sending a call received on one device to another device (e.g., call forwarding), performing a call screening operation, accepting a call, playing an announcement, placing a call on hold, scheduling a call back operation, performing an automatic call back operation, performing a call block operation, or bridging a caller onto the current call.

When a call forwarding operation is invoked, forwarding number information includes a number to which the call should be forwarded. Nature of forwarding number information identifies the nature of the call forwarding number. For example, a number may be a national number or an international number.

Carrier access code may be a sequence of digits indicative of a specific carrier when a call should be routed using the specific carrier.

Announcement type identifies an announcement that should be played to the caller. This parameter, for example, may be used when the customer selects the play announcement option.

Ring cadence may be indicative of the ring cadence value that should be applied for the call. For example, different values may be used to designate normal cadence; short, short cadence; and short, short, long cadence; or any other possible cadences.

If, after a predetermined period of time, the notification server 520 has not received a response, then the call is accepted for the device receiving the RTCM notification (step 930). For example, after the period of time, the RTCM notification may disappear from the device's display and the device may start ringing. The customer may answer the call if he or she is available and chooses to do so. One of ordinary skill in the art will appreciate that other default actions may occur instead of allowing the call to go through. For example, a busy signal may be played, the call may be sent to voice mail, the call may be forwarded to a preferred forwarding number, an announcement may be played, etc.

If the customer responds by selecting one of the RTCM options, then the RTCM notification disappears from the display, and the RTCM server 602 receives the response and encrypts it, if necessary (step 932). RTCM server 602 proceeds to instruct ISCP 302 to route the incoming call based on the response from the customer (step 934). In one embodiment, RTCM server 602 instructs ISCP 302 by sending ISCP 302 the response information via a connection such as a GDI link. The ISCP 302 may decrypt the response data, if necessary, and route the call based on the response. For example, the service logic associated with ISCP 302 may take different actions based on the call disposition information and other information included in the response. Exemplary call routing options include place call on hold (step 936), forward call to another device (step 938), screen call (step 940), voice mail (step 942), accept call (step 944), play announcement (step 946), schedule call back (step 948), auto call back (step 950), conference call (step 952), and block call (step 954).

Selecting the place call on hold option (step 936) temporarily causes the call to be delayed until the customer is ready to speak or otherwise deal with the call. For example, when the caller is placed on hold, an announcement may be played for the caller (e.g., "The party you are trying to reach is currently on a call, but wishes to talk with you. Please stay on the line.") The popup may remain on the screen in this case and display the time elapsed since placing the caller on hold.

If a customer decides to forward the call to another device (step 938), then RTCM server 602 instructs ISCP 302 to route the call to a device other than the one on which the RTCM notification was received. In one embodiment, the customer may preset the phone number of the device to which the call should be forwarded. This device may be one of a plurality of devices that are normally associated with the customer (e.g., part of a list of devices stored in a digital companion database). The device may also be a device that is not one of the customer's normal potential preferred devices, but the customer has some reason that he or she wants to receive calls on the device (e.g., the device is physically close to the customer's temporary location, etc.).

In an alternative embodiment, upon selecting the forward call option, the customer may be presented with a query asking what number the call should be forwarded to. The customer may respond to the query by entering a phone number or selecting a number from a list of predetermined numbers.

When the call screening option (step 940) is selected, the RTCM server 602 causes a series of steps to occur for screening potential telemarketers or other unwanted callers. For example, when the RTCM notification indicates that the call is from a blocked, unavailable, or otherwise undesirable number, the customer may select the call screening option. The calling party may then be presented with an announcement requesting the calling party to leave a spoken name, a PIN (personal identification number), or a voice message. In one embodiment, the announcement may be accompanied by a Special Instruction Tone (SIT) cadence.

If the calling party leaves a name, the customer's device may then ring. The ring may be accompanied by a notification that gives the customer the option of taking the call, diverting the call to voice mail, deny the call, etc. The customer's device that rings may be preset or manually provided by the customer in response to a query. The device may also be whatever device originally received the RTCM notification. The call is routed according to the customer's selection. If the calling party enters a valid. PIN, the calling party's call may be connected to the customer right away. The call screening option is more fully explained in U.S. patent application Ser. No. 10/720,938, filed Nov. 24, 2003, which has already been incorporated by reference.

When the voice mail option is selected (step 942), the RTCM server 602 may instruct ISCP 302 to route the call to the customer's current preferred voice mail number. The preferred voice mail number may be preset or manually provided by the customer in response to a query. For example, when the customer selects the send to voice mail option, the popup (e.g., RTCM notification) goes away and the incoming call is sent to either a present voice mail box or a voice mail box provided by the customer in response to a query given to the customer after the popup went away.

When the accept call option is selected (step 944), the RTCM server 602 may instruct ISCP 302 to route the call to the device on which the customer received the RTCM notification. If the customer is connected to the Internet via dial-up access on the same phone line that the call is to be routed, the customer's Internet session may be immediately disconnected so that the call may be answered.

In cases where the play announcement option (step 946) is selected, the RTCM server 602 may instruct ISCP 302 to cause a predetermined recorded announcement to be played for the calling party. For example, the customer may wish to tell particular callers that he or she is not available, without giving them the option of leaving a voice message. One of ordinary skill in the art will recognize that other announcements may be played.

When the schedule call back option is selected (step 948), the RTCM server 602 may instruct ISCP 302 to cause an announcement to be played for the calling party. For example, the announcement could be "the party you are trying to reach is currently on a call but will call you back later." The RTCM server may also cause a prompt to be presented to the customer asking for the customer to set up a callback event in the digital companion calendar. This callback event may, with the customer's approval, send an e-mail or other message to the caller showing the intended date and time of the callback, if the caller is also a digital companion customer or has an e-mail address or other device indicator (e.g., phone number of a mobile phone capable of receiving text messages) in a contacts list associated with the called customer. When the time and date of the callback occur, a call may be automatically placed from the called customer to the calling party.

When the auto call back option is selected (step 950), the RTCM server 602 may instruct ISCP 302 to cause an announcement to be played for the calling party. For example, the announcement could be "the party you are trying to reach is currently on a call but will call you back as soon as that call is finished." When the customer's line is free (e.g., the customer is done with the previous call), a call may be automatically placed from the customer to the calling party.

When the conference call option is selected (step 952), the RTCM server may instruct ISCP 302 to cause the calling party to be bridged onto the current call. For example, the called customer may be on a telephone call with a first party when a second party calls the customer. If the customer selects the conference call option, a RTCM server 602 instructs ISCP 302 to create a conference call between the customer, the first party, and the second party. For example, in response to a request from RTCM server 602, ISCP 302 may instruct a switch handling the existing call between the customer and the first party to bridge the incoming call from the second party with the existing call. One of ordinary skill in the art will appreciate that the calling party can be bridged onto a conference call between the customer and multiple other parties instead of bridged onto a normal call between the customer and one other party.

When the block call option is selected (step 954), the RTCM server 602 may instruct ISCP 302 to cause a predetermined recorded announcement to be played for the calling party. For example, the announcement could be "the party you are trying to reach does not wish to speak to you." The calling party's number may also optionally be added to a call block list of numbers with which the customer does not wish to speak.

Figure 10:
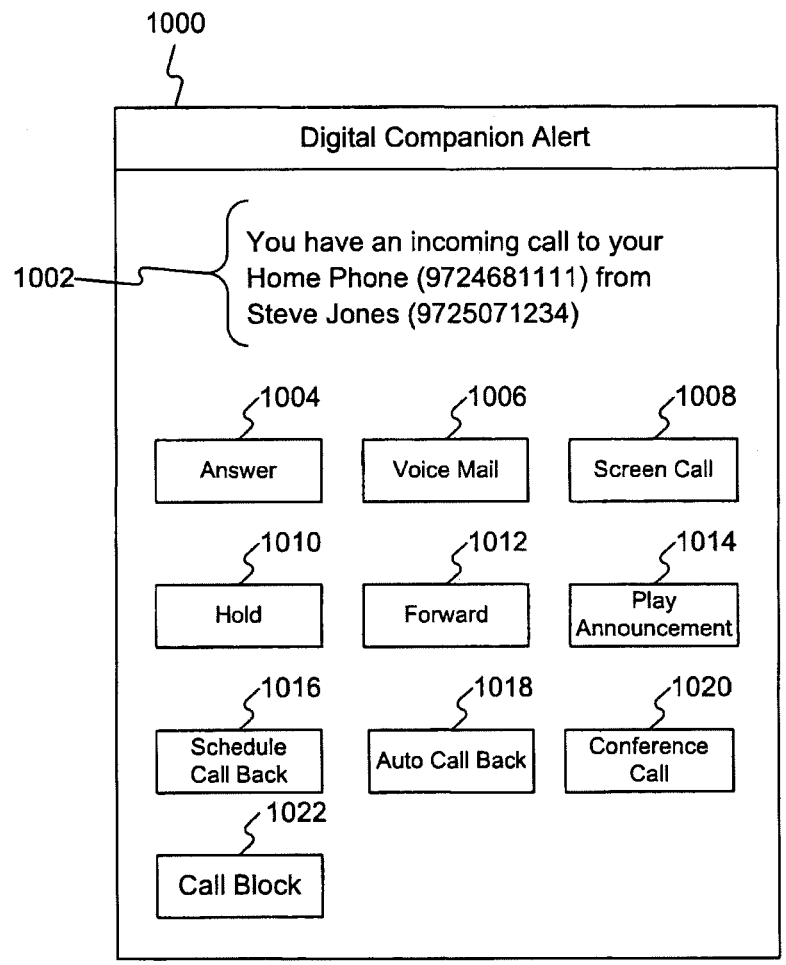
FIG. 10 is a diagram of an exemplary user interface including customer-selectable real-time call management options consistent with the present invention.

FIG. 10 is a diagram of an exemplary user interface 1000 including customer-selectable real-time call management options. User interface 1000 may be a display on a customer device, such as user terminal 112 or phone 114 that is currently showing an RTCM notification. The RTCM notification includes an area 1002 indicating that the customer has an incoming call. Area 1002 also provides an identification of the caller as well as the number being called. The number being called may belong to the device displaying the RTCM notification or another device. The RTCM has a number of user-selectable areas 1004-1022 associated with it, allowing the customer to decide how an incoming call is routed. In one embodiment, the customer may select one of these user-selectable areas through any suitable input methods. For example, the customer may click on the desired option using a mouse, touch an appropriate area of a touchscreen, enter input on a keypad, etc., in order to choose the manner in which the incoming call is routed.

Selecting area 1004 enables the customer to answer the call on the device that received the. RTCM notification (e.g., the device that includes user interface 1000). Selecting area 1006 forwards the call to voice mail as discussed above with reference to FIGS. 9A and 9B. Selecting area 1008 initiates a call screening feature as discussed above with reference to FIGS. 9A and 9B. Selecting area 1010 places the call on hold as discussed above with reference to FIGS. 9A and 9B. Selecting area 1012 forwards the call to another device of the customer's choosing as discussed above with reference to FIGS. 9A and 9B. Selecting area 1014 plays an announcement for the calling party as discussed above with reference to FIGS. 9A and 9B. Selecting area 1016 enables a customer to schedule a call back event on a calendar as discussed above with reference to FIGS. 9A and 9B. Selecting area 1018 enables a customer to cause the calling party to be automatically called back after the current call as discussed above with reference to FIGS. 9A and 9B. Selecting area 1020 bridges call party onto the current call as discussed above with reference to FIGS. 9A and 9B. Selecting area 1022 cause a recording to be played indicating that the customer does not wish to speak to the calling party and optionally cause the calling party's telephone number to be added to a call block list, as discussed above with reference to FIGS. 9A and 9B.

Figure 11:
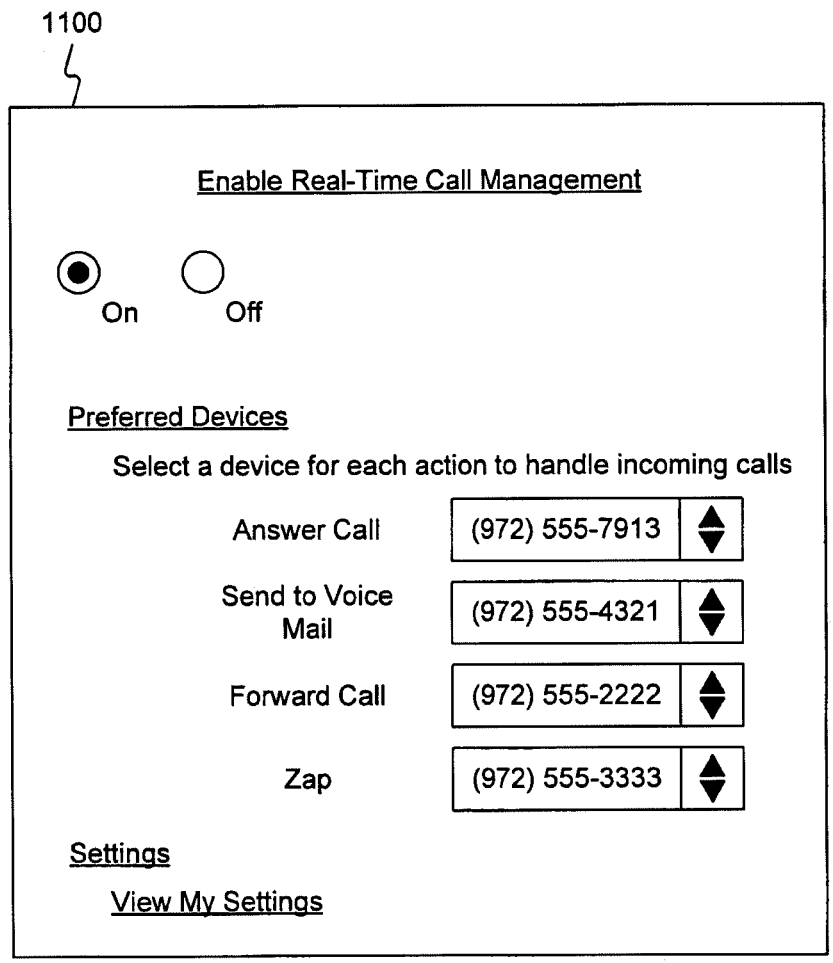
FIG. 11 is a diagram of an exemplary user interface that enables a customer to change preferences consistent with the present invention.

FIG. 11 is a diagram of an exemplary user interface 1100 that enables a customer to change preferences consistent with the present invention. As illustrated in FIG. 11, a customer may have the ability to enable or disable real-time call management for a given device. The customer also may select particular devices to handle different actions. For example, a customer may set specific phone numbers to handle features such as answer calls, send to voice mail, forward call, and/or telemarketer zap (e.g., call screening). One of ordinary skill in the art will appreciate that other features may also have phone numbers set for them. The customer also has the option of viewing various other settings associated with the customer, such as a list of numbers that are call blocked, call back settings, etc.

Other embodiments provide additional real-time call management options and features, including "chatting" with a caller by way of text-to-speech conversion, for example. A user (e.g., user 110) may "chat" with the caller before choosing the disposition of an incoming call. Further, some embodiments provide users with robust, real-time conference call management functions. For example, a user may be provided with capabilities for individually connecting or disconnecting conference call participants to/from the conference call. Call participants can also be individually muted. Further, users may be provided with capabilities for controlling multiple active, separate conference calls, including the ability to move call participants between the separate conference calls. Examples of "chat" and conference call features will now be described in more detail.

Figure 12:
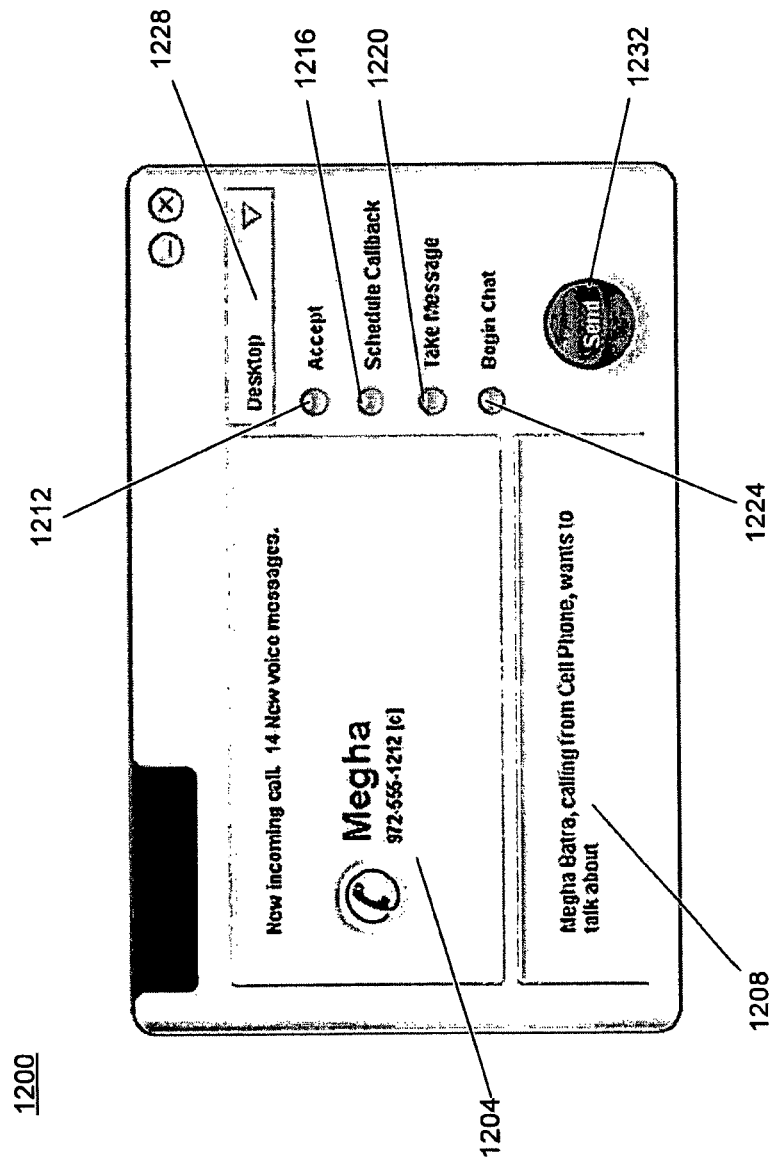
FIG. 12 is a diagram of another exemplary user interface including customer-selectable real-time call management options, according to another embodiment.

"Chat" and/or conference call features may be initiated by user selection of chat controls or conference call controls provided on a user interface. The selectable controls may be implemented similarly to the selectable controls shown in the user interface 1000 of FIG. 10. FIG. 12 is a diagram of another exemplary user interface 1200 including customer-selectable real-time call management options. User interface 1200 may be a display on a customer device, such as user terminal 112 or phone 114, 116 or 118 that is currently showing an RTCM notification. The RTCM notification includes an area 1204 indicating that the customer has an incoming call. Area 1204 may include any information tending to identify the caller, including the caller's name and/or telephone number. Caller information can be obtained from a database of contact information (e.g., the user's address book or another address book) or from caller information provided by a caller identification (caller ID) service. User interface 1200 may also include a call status information area 1208, which can include caller identifier information, as well as a subject of the incoming call if provided by the caller, User interface 1200 further includes selectable options that may be presented to the user for managing the incoming call. These options can include but are not limited to options to accept the call, schedule a callback, block the call, take a message, chat with the caller, and forward the call to another telephone number. If the user is on an active call when an incoming call is recognized, the user interface 1200 can include an option for adding the incoming call to the active call.

The embodiment of the user interface 1200 shown in FIG. 12 includes an accept-call control 1212, a schedule-callback control 1216, a take-a-message control 1220, a chat control 1224, a call forward pull-down menu 1228, and a send control 1232. With these selectable controls, user interface 1200 provides users with several options for managing incoming calls in real time. Execution of the accept-call, schedule-callback, take-a-message, call-forward, and send options may be performed in any of the ways described above.

Selection of the chat control 1232 initiates chat feature and a chat interface that allow users to use text-to-speech conversion to communicate with callers before choosing dispositions of incoming calls. A user can utilize chat features to make an informed decision of whether to take the incoming call. For example, if the user is on an active voice call, and an incoming voice call is received from a caller, the user can provide messages to the caller without interrupting the active call. The user may provide the messages by recording an audio message, using a keypad to enter a message, or typing a text message. The caller may similarly provide chat messages to the user. Through the chat features, the user can find out what the caller wants and send any desired response to the caller without interrupting a current call.

Figure 13:
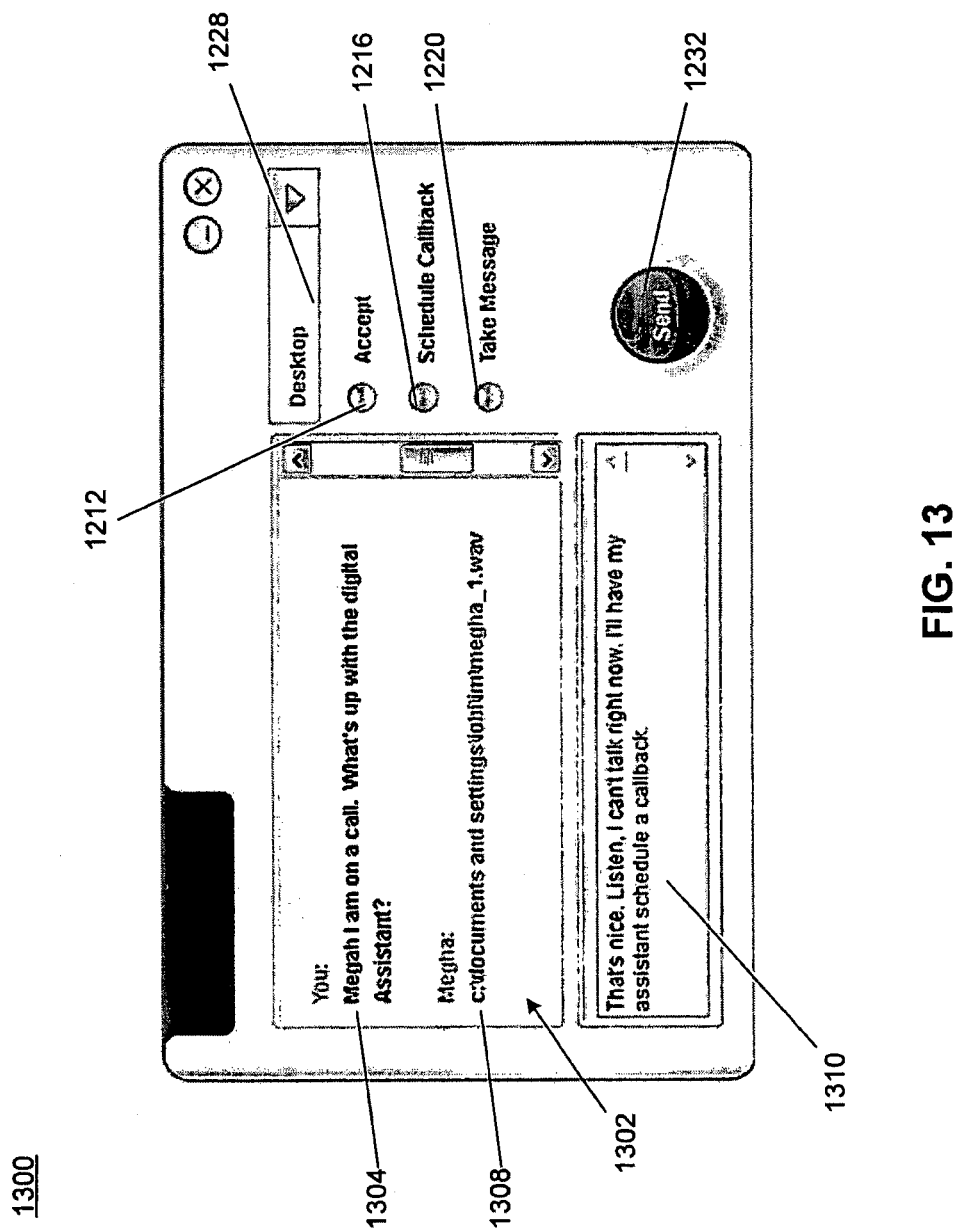
FIG. 13 is a diagram of an exemplary chat interface, according to one embodiment.

Upon selection of the chat control 1232, a chat interface is displayed. FIG. 13 is a diagram of an exemplary chat interface 1300, according to one embodiment. As shown in FIG. 13, chat interface 1300 can chronologically list messages sent back and forth between users and callers in area 1302. A message sent by a user is indicated at 1304, while a message from a caller is indicated at 1308. Message 1304 is shown in textual form in FIG. 13. The message from the caller 1308 shown in FIG. 13 is in the form of an audio file that the user can playback. Any known software application can be used to playback the audio file to the user.

Chat interface 1300 may include text field 1320 into which the user can type a text message to be sent to the caller. The text message may be sent from a user terminal (e.g., user terminal 112) to the service center 106 via a data network (e.g., the data network 102). The service center 106 is able to convert the text message to a voice message for playback to the caller. Any known text-to-speech converter can be implemented in the service center 106 to help perform this function. In yet another alternative, a user may provide a voice recording for playback to a caller.

Messages received from the caller may be recorded and put into any form that may be useful to the user. For example, the recorded message may be provided to a user terminal in the form of an audio file. Alternatively, a known speech-to-text converter may be implemented in the service center 106 for converting the recorded message from the caller to text form. Thus, the chat facility is able to support any combination of voice and text chat sessions between callers and users, prior to the disposition of a telephone call being determined.

Chat interface 1300 may include selectable controls for real-time management of an incoming call. The selectable controls may be selected before, after, or at any time during a chat session between a user and a caller. Based on exchanged chat messages between the caller and the user, the user may determine whether to accept the incoming call, schedule a callback, take a message, block the call, forward the call to another telephone number, ignore the call, or select any other call disposition described above. By chatting with callers before the disposition of a call is selected, users are able to obtain information from and provide information to callers to facilitate informed decisions concerning the dispositions of incoming calls. As shown in the embodiment of FIG. 13, chat interface 1300 includes the accept-call control 1212, the schedule-callback control 1216, the take-a-message control 1216, the call forward drop-down menu 1228, and the send control 1232, each of which may be selected to determine a disposition of an incoming telephone call, as described above.

Figure 14:
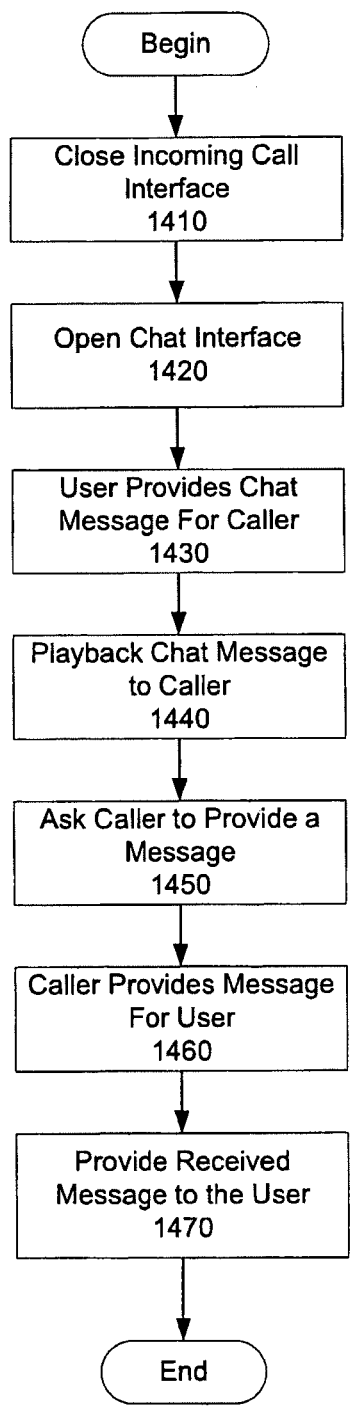
FIG. 14 is a flowchart illustrating an exemplary method of providing chat features, according to one embodiment.

FIG. 14 is a flowchart illustrating an exemplary method of providing chat features, according to one embodiment. While the steps of the flowchart are described in a particular order, one skilled in the art will appreciate that the steps may be performed in a modified or different order. One or more of the steps may be performed concurrently or in parallel. Further, certain steps may be omitted from or added to the flowchart.

The method of FIG. 14 begins by closing an incoming-call interface, such as user interface 1200, in response to the selection of a chat control (step 1410). A chat interface, such as chat interface 1300, is displayed (step 1420). The chat interface is typically displayed at a user terminal, such as user terminal 112. A user provides a chat message to be sent to a caller (step 1430). The user can select from predefined messages (e.g., prerecorded messages), record a new message, or key in or type a message (e.g., typing a message into the text field 1310 shown in FIG. 13). The user then elects to send the message.

The chat message is played back to the caller who initiated the incoming call (step 1440). The performance of this step in the environment 100 of FIG. 1 entails transmitting data representative of the chat message from the user terminal 112 to the service center 106 via the data network 102. If the chat message is in a format other than audio, the message will be converted to an audio message using known technologies (e.g., text-to-speech technologies). An RTCM server (e.g., RTCM server 602) at the service center 106 may instruct equipment in the voice network 104 (e.g., the ISCP 302) to cause the audio formatted chat message to be played for the caller.

The caller is asked to provide a message in response to the chat message (step 1450). An RTCM server (e.g., RTCM server 602) at the service center 106 may instruct equipment in the voice network 104 (e.g., the ISCP 302) to cause a message to be played to the caller to request that the caller provide a message.

The caller provides a message (step 1460). The caller typically records an audio message, which may be recorded in any known audio file format. However, the caller may provide the message in other formats, including text messages and DTMF messages, for example.

The message from the caller is transmitted and provided to the user (step 1470). The performance of this step in the environment 100 of FIG. 1 entails the service center 106 receiving the caller message from the voice network 104. The service center 106 records the caller message. In one embodiment, for example, the voice recognition server 416 may receive and interpret the caller message. The application server 414 may take the output from the voice recognition server 416, convert the output to a format suitable for the service center 106 (e.g., a digital audio file), and forward the converted message to one or more of the digital companion servers 406. The digital companion servers 406 may send the caller message to the user terminal 112, which can present the caller message to the user 110. For example, the user terminal 112 may play back an audio file containing the message from the caller.

Steps 1430 through 1470 of the method of FIG. 14 may be repeated for additional exchanges of chat messages between users and callers. The method will terminate if the caller disconnects (e.g., hangs up) or if the user closes the chat interface 1300. If the caller disconnects, the service center 106 can notify the user that the caller has disconnected. As can be appreciated from the method described in FIG. 14, the chat features described may be performed prior to actually establishing a call connection between the calling party and the called party (the user), thus allowing the user to obtain further information concerning the requested call prior to deciding how to dispose of the call (accept, reject, forward, etc.).

As mentioned above, some embodiments provide users with robust, real-time conference-call functionalities. For example, users may be provided with capabilities for individually connecting or disconnecting conference call participants to/from the conference call. Call participants can also be individually muted. Further, users may be provided with capabilities for controlling multiple active, separate conference calls, including the ability to move call participants between the separate conference calls.

Figure 15:
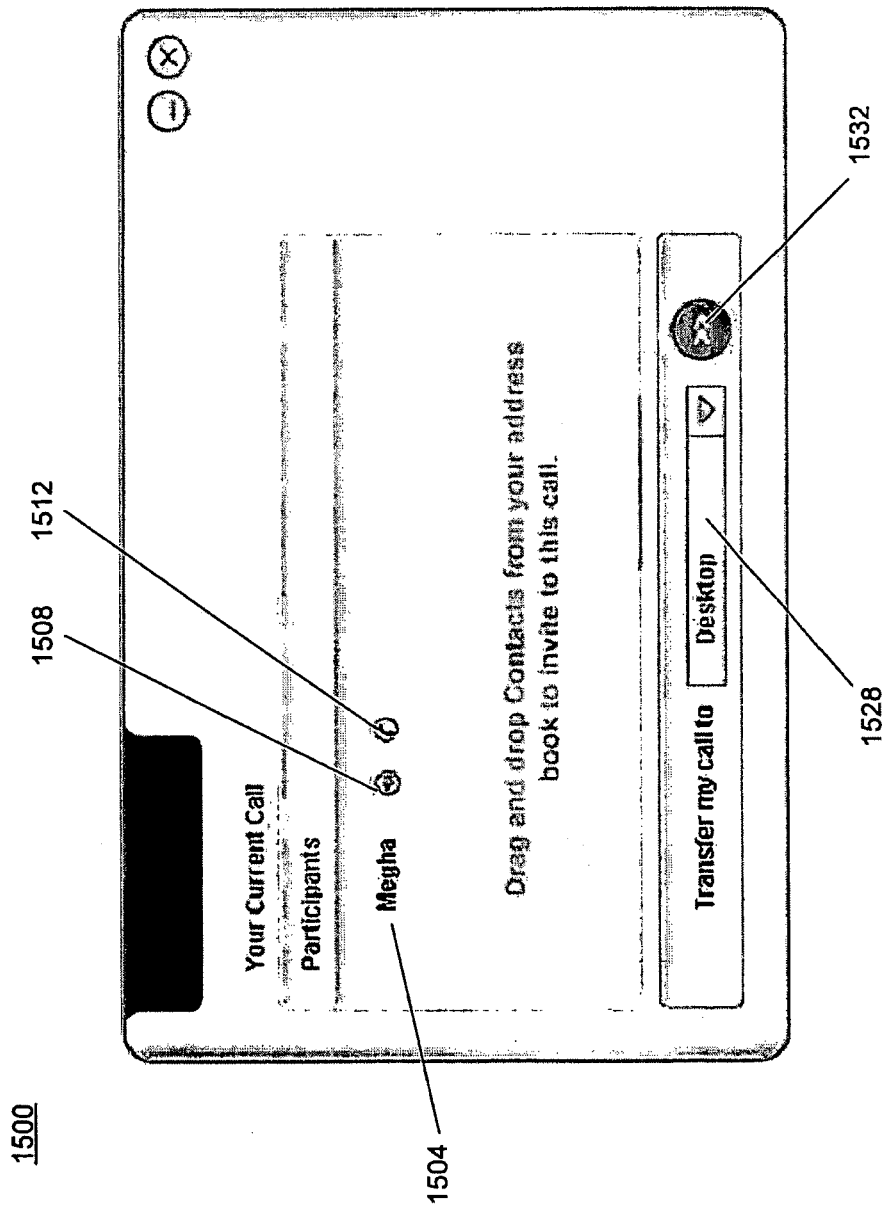
FIG. 15 is a diagram of an exemplary active-call user interface, according to one embodiment.

Conference call capabilities may be invoked from any of the user interfaces described above, or from other embodiments of user interfaces, such as an exemplary active-call user interface 1500 shown in FIG. 15. Active-call interface 1500 may be presented to users whenever the service center 106 supports or is aware of an active call, including any active calls in which a user is a participant. User interface 1500 may be a display on a customer device, such as user terminal 112 or phone 114.

As shown in FIG. 15, active-call interface 1500 can include area 1504, which includes information about call participants, such as the name of a call participant, for example. The area 1504 may include any other types of information tending to identify participants of a telephone call. Active-call interface 1500 may also include a mute control 1508 and a connect/disconnect control 1512 associated with each call participant. With controls 1508 and 1512, users are able to mute, unmute, connect, and disconnect call participants on an individual basis. Accordingly, users can change a call disposition or setting for one call participant, without affecting the call dispositions or settings of other call participants. This is particularly beneficial for managing conference calls, as discussed below.

Active-call interface 1500 also provides options that enable users to transfer an active telephone call to another destination (e.g., another telephone number). As shown in FIG. 15, active-call interface 1500 includes a drop-down menu 1528 that a user can use to select a destination to which the call should be transferred. FIG. 15 illustrates a pull-down option showing that an active call is connected to a user's computer desktop (i.e., a telephone number associated with the user's desktop). The user may transfer the call from the desktop to another telephone number by using the pull-down menu to select another destination. Send control 1532 can be selected to initiate a transfer of the active call to the selected destination number. The drop-down menu 1528 may be populated with different telephone numbers so that the user can transfer calls from one telephone number to another without any interruption to the active call.

By way of example of a call transfer, a user may be using his work telephone number to participate in a conference call and wish to leave his office while continuing to participate in the conference call. The user can utilize the drop-down menu 1528 and send control 1532 to transfer the conference call to the user's mobile telephone. Alternatively, the user may enter a target transfer telephone number to which the call will be transferred.

As mentioned above, active-call interface 1500 provides users with capabilities for ad hoc establishment, control, and termination of conference calls on a participant-by-participant basis. For example, the user may mute or disconnect a single participant without affecting connections with other participants. Further, participants can be invited to join conference calls, or conference calls can be initiated by simply dragging contact information from another application (e.g., the user's contacts list) and dropping the contact information into the active-call interface 1500. In particular, contact information can be dropped in area 1504 to conveniently invite potential call participants to join an active call. For example, the user can initiate a call to a potential participant simply by dragging contact information from another application (e.g., an address book) and dropping that contact information into area 1504. The RTCM server 602 will then instruct the ISCP 302 to call the target telephone number and bridge that call into the active call to establish a conference call. The process may be repeated to add additional participants to the conference call.

In some embodiments, active-call interface 1500 may include more than one area 1504, with each area 1504 including information for a specific conference call. This allows users to manage multiple conference calls, including moving call participants from one conference call to another. For example, users are able to utilize a drag-and-drop control to move a call participant from one active call to another by dragging a participant identifier from a first active call representation (i.e., a first area 1504) and dropping said participant identifier in a second active call representation (i.e., another area 1504).

Figure 16:
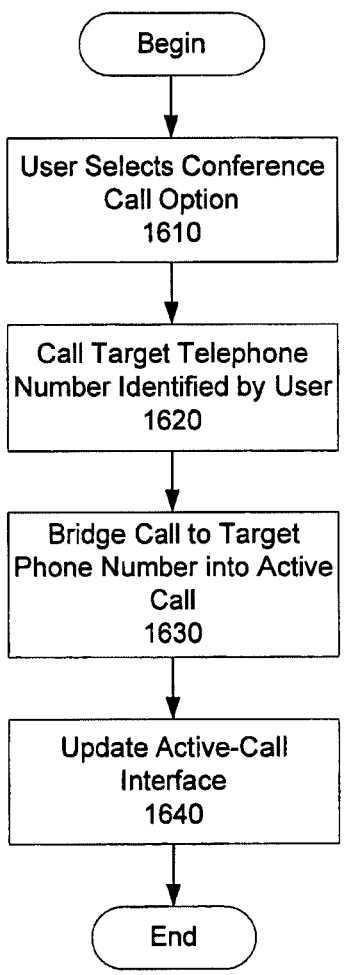
FIG. 16 is a flowchart diagram illustrating an exemplary method of inviting a participant to join an active call, according to one embodiment.

FIG. 16 is a flowchart diagram illustrating an example of a method for inviting a participant to join an active call, according to one embodiment. While the steps of the flowchart are described in a particular order, one skilled in the art will appreciate that the steps may be performed in a modified or different order. One or more of the steps may be performed concurrently or in parallel. Further, certain steps may be omitted from or added to the flowchart.

The method of FIG. 16 begins by a user selecting a conference call option (step 1610). The conference call option may include an instruction to invite another party to join an already active call. For example, a user may drag and drop contact information for a target person into area 1504 of active-call interface 1500, as described above. Alternatively, the user may enter a target telephone number in another manner, such as by keying in the telephone number.

The provided target telephone number is called (step 1620). This step may include the RTCM server 602 instructing equipment in the voice network 104 (e.g., the ISCP 302) to call (or initiate a call to) the target telephone number.

The call to the target telephone number is bridged into the existing active call (step 1630). This step may include the RTCM server 602 instructing equipment in the voice network 104 (e.g., the ISCP 302) to cause the call to the target telephone number to be bridged into the active call.

The active-call interface 1500 is updated (step 1640). The updating may include adding information related to the new call participant to area 1504. Individual controls (e.g., mute and disconnect controls) may also be associated with the new call participant. The steps shown in FIG. 16 may be repeated to add additional participants to the conference call.

In the above-described manner, a convenient and intuitive process is provided for adding participants to active calls. The "drag and drop" feature described above further provides users with the ability to concurrently invite participants to join a conference call. For example, the user may drop contact information of multiple participants into area 1504 of the active-call interface 1500.

As mentioned above, users are also provided with the ability to disconnect participants from conference calls on an individual basis. The active-call interface 1500 shown in FIG. 15 includes a connect/disconnect control 1512 for each call participant. By using the connect/disconnect control 1512, a user is able to conveniently connect and/or disconnect participants on a participant-by-participant basis. When the disconnect control 1512 is selected, the associated participant is dropped from the conference call. The RTCM server 602 may instruct equipment in the voice network 104 (e.g., the ISCP 302) to cause the call to the identified telephone number to be disconnected and/or removed from the conference call bridge. The active-call interface 1500 is updated to reflect the change.

Users are also provided with capabilities for muting and unmuting conference call participants on an individual basis. Active-call interface 1500 includes a mute control 1508 for each call participant. By selecting a mute control 1512, the user is able to toggle between a mute and an unmute setting for each of the call participants. This allows users to selectively choose which call participants will be allowed to hear audible communications from the users.

In addition, multiple conference calls can be concurrently established, and users can jump back and forth between different conference calls. Users can also conveniently move call participants between different conference calls. For example, an icon representative of a call participant in a first conference call can be dragged and dropped in a second conference call in order to bridge the call participant into the second conference call. The RTCM server 602 may instruct equipment in the voice network 104 (e.g., the ISCP 302) to cause the identified call participant to be bridged into the second conference call. The active-call interface 1500 is updated to reflect the change.

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. Many modifications of the disclosed embodiments will be readily apparent to those skilled in the art. One skilled in the art will also appreciate that all or part of the systems and methods consistent with principles of the present invention may be stored on or read from computer-readable media, such as secondary storage devices, like hard disks, floppy disks, and CD-ROM; a carrier wave received from a network such as the Internet; or other forms of ROM or RAM. It is intended that the scope of the invention be defined by the following claims in light of their full scope of equivalents.

What is claimed is:

1. A method comprising:
provided, by a device, a user interface for presentation,
the user interface being, for managing a conference call associated with a plurality of participants,
the plurality of participants including a first participant and a second participant, and
the user interface including:
one or more first selectable controls for managing first participation, of the first participant, in the conference call, and
one or more second selectable controls for managing second participation, of the second participant, in the conference call;
identifying, by the device, a selection of a control of the one or more first selectable controls; and
managing, by the device, and based on the selection of the control of the one or more first selectable controls, the first participation in the conference call without affecting the second participation in the conference call.

2. The method of claim 1, further comprising:
adding the second participant to the conference call based on a user, of the device, dragging and dropping contact information of the second participant into a particular area of the user interface.

3. The method of claim 1, where managing the first participation includes:
individually muting or unmuting the first participant without affecting the second participation in the conference call.

4. The method of claim 1, where the first participation includes:
individually disconnecting the first participant from the conference call without affecting the second participation in the conference call.

5. The method of claim 1, where managing the first participation includes:
moving the first participant from the conference call to another conference call,
the moving being initiated by the customer dragging, and dropping an identifier from a first area of the user interface, associated with the conference call, to a second area of the user interface associated with the other conference call.

6. A device comprising:
a processor to:
provide, for display in a user interface, one or more first selectable controls for managing, first participation, of a first participant, in a conference call,
provide, for display in the user interface, one or more second selectable controls for managing second participation, of a second participant, in the conference call,
receive a selection of a selectable control of the one or more first selectable controls, and
manage, based on receiving the selection, the first participation in the conference call without affecting the second participation in the conference call.

7. The device of claim 6,
where the selectable control includes a mute control for muting the first participant, and
where, when managing the first participation, the processor is to:

mute the first participant based on the selection of the selectable control.

8. The device of claim 6,
where the selectable control includes a disconnect control for disconnecting the first participant from the conference call, and
where, when managing the first participation, the processor is to:
   disconnect the first participant from the conference call based on selection of the selectable control.

9. The device of claim 6, where the processor is to:
identify a target telephone number based on contact information being dragged from an external application program and dropped into the user interface, and
add a third participant to the conference call based on the target telephone number.

10. The device of claim 6, where the processor is further to:
move the second participant from the conference call to another conference call based on dragging of a participant identifier from a first active call representation, associated with the conference call, and dropping of the participant identifier into a second active call representation associated with the other conference call.

11. The device of claim 6,
where the user interface is for managing a plurality of separate conference calls, and
where the plurality of separate conference calls include the conference call.

12. The device of claim 6, where the processor is further to:
add a third participant to the conference call in real time.

13. A method comprising:
establishing, by a processor, a telephone call between a plurality of users,
   the plurality of users including a first user and a second user;
providing, by the processor and to a user of the plurality of users, an interface for managing the telephone call,
   the interface including:
      one or more first options for managing first participation of the first user in the telephone call, and
      one or more second options for managing second participation of the second user in the telephone call;
receiving, at the processor, a selection of a particular option of the one or more first options for modifying the first participation in the telephone call; and
modifying, by the processor and based on receiving the selection of the particular option, the first participation in the telephone without affecting the second participation in the conference call.

14. The method of claim 13,
where the particular option includes an option to mute the first user in the telephone call, and
where modifying the first participation includes muting the first user in the telephone call.

15. The method of claim 13,
where the particular option includes an option to disconnect the first user from the telephone call, and
where modifying the first participation includes disconnecting the first user from the telephone call.

16. The method of claim 13, further comprising:
receiving, via the interface, an indication that a third user is to be added to the telephone call; and
sending, based on the indication, an invitation to the third user to join the telephone call.

17. The method of claim 13,
where a third user initiates the telephone call, and
where the method further comprises:
   receiving, via the interface, an indication that the telephone call is to be transferred from a first phone associated with the third user to a second phone associated with the third user; and
   transferring, based on the indication, the telephone call from the first phone to the second phone.

18. The method of claim 17, where the interface includes a menu of telephone numbers corresponding to the first phone and the second phone.

19. The method of claim 13, where modifying the first participation in the telephone call includes disconnecting the first user from the telephone call while maintaining the telephone call liar the user and one or more other users that are participating in the call.

* * * * *